(12) United States Patent
Matsuda et al.

(10) Patent No.: US 7,134,689 B2
(45) Date of Patent: Nov. 14, 2006

(54) INFLATOR

(75) Inventors: Naoki Matsuda, Himeji (JP); Yasunori Iwai, Shijyonawate (JP); Nobuyuki Katsuda, Himeji (JP)

(73) Assignee: Daicel Chemical Industries, Ltd., Osaka (JP)

( * ) Notice: Subject to any disclaimer, the term of this patent is extended or adjusted under 35 U.S.C. 154(b) by 125 days.

(21) Appl. No.: 10/305,234

(22) Filed: Nov. 27, 2002

(65) Prior Publication Data

US 2003/0151241 A1 Aug. 14, 2003

Related U.S. Application Data

(60) Provisional application No. 60/411,085, filed on Sep. 17, 2002, provisional application No. 60/409,267, filed on Sep. 10, 2002, provisional application No. 60/403,659, filed on Aug. 16, 2002, provisional application No. 60/359,989, filed on Feb. 28, 2002.

(30) Foreign Application Priority Data

| Nov. 30, 2001 | (JP) | ............................. 2001-367283 |
| Nov. 30, 2001 | (JP) | ............................. 2001-367536 |
| Aug. 12, 2002 | (JP) | ............................. 2002-234431 |
| Sep. 3, 2002 | (JP) | ............................. 2002-258010 |
| Sep. 11, 2002 | (JP) | ............................. 2002-264946 |
| Nov. 7, 2002 | (JP) | ............................. 2002-323737 |

(51) Int. Cl.
*B60R 21/26* (2006.01)

(52) U.S. Cl. ...................... 280/736; 280/737; 280/741

(58) Field of Classification Search ................ 280/736, 280/737, 741
See application file for complete search history.

(56) References Cited

U.S. PATENT DOCUMENTS 3,797,854 A * 3/1974 Poole et al. ................. 280/741
3,836,170 A * 9/1974 Grosch et al. .............. 280/737
3,901,530 A * 8/1975 Radke ........................ 280/736

(Continued)

FOREIGN PATENT DOCUMENTS

JP 44-10443 B 5/1969

(Continued)

*Primary Examiner*—Paul N. Dickson
*Assistant Examiner*—George D. Spisich
(74) *Attorney, Agent, or Firm*—Birch, Stewart, Kolasch & Birch, LLP

(57) ABSTRACT

Combustion residues of a gas generating agent remain in an inflator due to composition of the gas generating agent, temperature difference between combustion gas and pressurized gas isolated by a rupturable plate, collision of the combustion gas against a wall surface and the like. The inflator inflates an air bag with pressurized gas and combustion gas, while satisfying the following requirements: (1) pressurized gas contains an inert gas and substantially no oxygen; (2) in the gas generating agent, a pressure is 0.8 or less; (3) a mole ratio of an amount of pressurized gas and the combustion gas is 1 to 10; (4) a ratio of a mass of pressurized gas and the gas generating agent is 1 to 10; (5) a mass of a gas generating agent is 1 to 30 g; and (6) the pressurized gas is charged at 30,000 to 67,000 kPa.

53 Claims, 22 Drawing Sheets

U.S. PATENT DOCUMENTS

| | | | |
|---|---|---|---|
| 3,966,226 A | | 6/1976 | Roth |
| 4,018,457 A | | 4/1977 | Marlow |
| 4,131,299 A | * | 12/1978 | Ono et al. .................. 280/736 |
| 4,998,751 A | * | 3/1991 | Paxton et al. ............... 280/741 |
| 5,031,932 A | * | 7/1991 | Frantom et al. ............ 280/741 |
| 5,076,607 A | * | 12/1991 | Woods et al. ............... 280/737 |
| 5,078,422 A | * | 1/1992 | Hamilton et al. ............ 280/736 |
| 5,125,684 A | * | 6/1992 | Cartwright .................. 280/736 |
| 5,226,667 A | * | 7/1993 | Coultas ....................... 280/734 |
| 5,462,307 A | * | 10/1995 | Webber et al. .............. 280/737 |
| 5,470,104 A | * | 11/1995 | Smith et al. ................. 280/737 |
| 5,564,743 A | * | 10/1996 | Marchant .................... 280/741 |
| 5,584,504 A | * | 12/1996 | Cuevas et al. ............... 280/737 |
| 5,602,361 A | * | 2/1997 | Hamilton et al. ........... 102/288 |
| 5,645,296 A | * | 7/1997 | Okada et al. ................ 280/736 |
| 5,711,546 A | * | 1/1998 | Hamilton et al. ........... 280/736 |
| 5,743,557 A | * | 4/1998 | Butt ............................. 280/737 |
| 5,788,275 A | * | 8/1998 | Butt et al. ................... 280/737 |
| 5,803,492 A | * | 9/1998 | Rink et al. ................... 280/737 |
| 5,913,537 A | * | 6/1999 | Goetz .......................... 280/741 |
| 6,068,292 A | * | 5/2000 | Renz ........................... 280/737 |
| 6,189,922 B1 | | 2/2001 | Parks et al. |
| 6,368,431 B1 | * | 4/2002 | Mangum et al. ............ 149/19.7 |
| 6,487,974 B1 | * | 12/2002 | Canterberry et al. ........ 102/531 |
| 6,488,310 B1 | * | 12/2002 | Ryobo et al. ................ 280/736 |
| 6,634,302 B1 | * | 10/2003 | Rink et al. ................... 102/530 |
| 6,808,204 B1 | * | 10/2004 | Katsuda et al. .............. 280/741 |
| 6,857,657 B1 | * | 2/2005 | Canterberry et al. ........ 280/737 |
| 6,880,853 B1 | * | 4/2005 | Watase et al. ............... 280/741 |
| 2002/0053789 A1 | * | 5/2002 | Fujimoto et al. ............ 280/741 |
| 2003/0001369 A1 | * | 1/2003 | Iwai et al. ................... 280/741 |

FOREIGN PATENT DOCUMENTS

| | | |
|---|---|---|
| JP | 8-282427 A | 10/1996 |
| JP | 9-76870 A | 3/1997 |
| JP | 2963086 B | 8/1999 |
| JP | 2002-166817 A | 6/2001 |
| WO | WO 99/15376 A1 | 1/1999 |
| WO | WO 99/15377 A | 4/1999 |

* cited by examiner

INFLATOR

This application claims priority on provisional Application Nos. 60/359,989; 60/403,659; 60/409,267; and 60/411,085 filed on Feb. 28, 2002; Aug. 16, 2002; Sep. 10, 2002; and Sep. 17, 2002, respectively, and on Japanese Application Nos. 2001-367283; 2001-367536; 2002-234431; 2002-258010; 2002-264946; and 2002-323737, filed in Japan on Nov. 30, 2001; Nov. 30, 2001; Aug. 12, 2002; Sep. 3, 2002; Sep. 11, 2002; and Nov. 7, 2002, respectively, the entire contents of which are hereby incorporated by reference.

BACKGROUND OF THE INVENTION

1. Field of the Invention

The present invention relates to an inflator suitable for an air bag system for an automobile. The present invention also provides an inflator in which pieces of a broken rupturable plate or combustion residues of a gas generating agent are prevented from flowing out of the inflator.

2. Description of the Related Art

As an inflator used in an air bag system for an automobile, there is a type in which an air bag is inflated by using only combustion gas of a gas generating agent and also a type in which an air bag is inflated by using combustion gas of a gas generating agent and pressurized gas. In either type of inflators, it is required that combustion residues generated at the time of combustion of the gas generating agent, for example, powdery metal or metal oxide generated due to components of the gas generating agent are never discharged into the air bag. Therefore, such a trial has been made that generation of combustion residues is suppressed by changing composition of the gas generating agent or a structure of the inflator.

In addition, there is a type in which an air bag is inflated by using only pressurized gas. However, with a development of an inflator for an inflating-type safety system for an automobile, an inflator using pressurized gas and a gas generating agent together is attracting attention.

Also, such a trial has been made that a filter is disposed to prevent pieces of a broken rupturable plate from flowing outside, or that generation of combustion residues is suppressed by changing composition of the gas generating agent, or a structure of the inflator.

As related art, there are JP-A 9-76870, U.S. Pat. No. 3,966,226, and U.S. Pat. No. 4,018,457.

An essential requirement in designing the inflator is that an air bag has to be inflated by a predetermined amount within a predetermined time to actuate the air bag effectively, and various proposals about the structure have been made conventionally. For example, there is JP-A 8-282427. As other related art, there have been known JP-B 44-10443, U.S. Pat. No. 6,189,922, and JP-A 2002-166817.

Since the inflator is installed in an automobile, the weight and size of the inflator which influences a weight of an automobile are important design requirements. Accordingly, further reduction in weight of an inflator is required while maintaining its original functions.

SUMMARY OF THE INVENTION

An object of the present invention is to provide an inflator in which a gas generating agent and a structure of the inflator are improved and combined to obtain a synergistic effect so that an amount of combustion residues discharged from the inflator is suppressed.

The present invention (I-1) provides, as one means for solving the above problem, an inflator in which an air bag is inflated by combustion gas generated by combustion of a gas generating agent and a pressurized medium, comprising means for making the combustion gas strike against at least one surface so that combustion residues adhere to the at least one wall surface, and also means for inducing the combustion gas to make contact with the pressurized medium so that the combustion residues contained in combustion gas are cooled and solidified due to a temperature difference, wherein a melting point of the combustion residues generated due to combustion of the gas generating agent is equal to or more than a discharging temperature of a gas generated from the gas generating agent.

Further, the present invention (I-2) provides, as another means for solving the above problem, an inflator in which an air bag is inflated by combustion gas generated by combustion of a gas generating agent and a pressurized medium, comprising means for changing a flowing direction of combustion gas to make combustion residues in the combustion gas adhere to at least one wall surface, and also means for inducing the combustion gas to make contact with the pressurized medium so that the combustion residues in combustion gas are cooled and solidified due to a temperature difference, wherein the melting point of the combustion residues generated due to combustion of the gas generating agent is equal to or more than a discharging temperature of a gas generated from the gas generating agent.

The above-described inventions are provided with the means for arresting the combustion residues contained in combustion gas of the gas generating agent respectively, the following advantageous effects (1) to (3) can be obtained.

Advantageous Effect (1)

By associating the discharging temperature of a gas generated from a gas generating agent and the melting point of a combustion residue contained in the combustion gas, generation of a massive (slag-like) combustion residue can be promoted. The temperature of the discharged gas of the gas generating agent can be obtained on the basis of a pressure inside the tank (an actually measured value) and a generated gas amount obtained at the time of being burnt in the tank having a predetermined volume and further the specific heat of the generated gas, for example, according to the following formula (values other than T2 in the formula can be obtained by calculations or the like). When the melting point of the residue becomes sufficiently higher than the temperature of the discharged gas (not less than 100° C., preferably not less than 500° C.), the combustion residue can be easily solidified and becomes massive (slag-like), and it remains inside the inflator to be suppressed from being discharged outside of the inflator.

$$\frac{C_{V_1} M_1 T_1}{a} + \frac{C_{V_2} M_2 T_2}{b} = \frac{\left\{\frac{C_{V_1} M_1 + C_{V_2} M_2}{M_1 + M_2}\right\} \times (M_1 + M_2) \times T_3}{C}$$

In the formula, the meanings of symbols are as follows:
a term: calorie of initial air in a tank
b term: calorie of discharged gas (gas discharged into the tank)
c term: calorie of mixed gaseous matter in the tank after actuation of the inflator (after mixed with initial air in the tank)
Cv1: average specific heat of air
M1: the mole number of air T1: air (before actuation) temperature
Cv2: average specific heat of discharged gas
M2: the mole number of discharged gas
T2: discharged gas temperature
T3: gas temperature after being mixed (calculated according to an formula of state of ideal gas)

Advantageous Effect (2)

By cooling the combustion gas due to a temperature difference from the pressurized medium, combustion residues can be solidified. When the combustion gas having a higher temperature and the pressurized medium having a lower temperature contact with each other, the combustion residues having a higher temperature are cooled and solidified and become massive (slag-like) and remain inside the inflator so that the residues are suppressed from being discharged outside the inflator. The advantageous effect (2) can be further improved owing to a synergism with the advantageous effect (1).

Advantageous Effect (3)

By making combustion gas flow strike against a wall surface, combustion residues adhere to the wall surface. Since the combustion residues contained in the combustion gas have a higher temperature and the pressurized medium has a lower temperature, the combustion residues are solidified when the residues contact with the pressurized medium as in the above advantageous effect (2). And further, the combustion residues, being solidified, are made to strike against the wall surface, and thereby, the amount of combustion residues discharged outside of the inflator can be reduced. The advantageous effect (3) can be further improved owing to a synergism with the advantageous effects (1) and (2).

In order to easily obtain the advantageous effects (1) to (3) in the respective above inventions, a preferable inflator comprises an outer shell made of a cylindrical pressurized medium chamber housing, a pressurized medium chamber charged with a pressurized medium, a gas generator which is connected to one end of the pressurized medium chamber and includes ignition means and a gas generating agent accommodated in a gas generator housing, and a diffuser portion connected to the other end of pressurized medium chamber, wherein a first rupturable plate closes between the pressurized medium chamber and the gas generator, a second rupturable plate closes between the pressurized medium chamber and the diffuser portion, and further, a cap, which has a gas ejecting hole in at least one of the side surface and end surface, covers the first rupturable plate from the pressurized medium chamber side.

As describe above, the first rupturable plate closes between the pressurized medium chamber and the gas generator, and thereby, even when the gas generating agent is burnt, a sufficient temperature difference between the combustion gas and the pressurized medium can be obtained to exhibit a solidifying effect of the combustion residues. Accordingly, even when the inflator is kept under a high temperature (for example, inside an automobile including an air bag apparatus provided with an inflator, in summer), a temperature of the pressurized medium is much lower than a discharging temperature of the gas generating agent, thereby exhibiting a solidifying effect of the combustion residues. However, in case of not having the first rupturable plate, the pressurized medium is heated by the combustion heat of the gas generating agent, so that the temperature difference between the pressurized medium and the discharged gas becomes smaller, thereby reducing the solidifying effect of the combustion residues.

Also, since the gas generating agent exists under a normal pressure, deterioration of the gas generating agent due to pressure is reduced as compared with a case of existing under a high pressure. Further, by providing the cap having a gas ejecting hole in at least one of a side surface and an end surface, the combustion gas easily strikes against a wall surface of the pressurized medium chamber housing. Incidentally, in order to enhance an arresting effect of the combustion residue, a cap can also be provided in the second rupturable plate side.

Also, the present invention (I-4) provides, as another means for solving the above problem, an inflator comprising an outer shell made of a cylindrical pressurized medium chamber housing, a pressurized medium chamber charged with a pressurized medium, a gas generator which is connected to one end of the pressurized medium chamber and includes ignition means and a gas generating agent accommodated in a gas generator housing, and a diffuser portion connected to the other end of pressurized medium chamber, wherein a first rupturable plate closes between the pressurized medium chamber and the gas generator, a second rupturable plate closes between the pressurized medium chamber and the diffuser portion, a cap covers the first rupturable plate from the pressurized medium chamber side and further, at least one selected from the following requirements (a) to (c) is provided:

(a) an inner wall surface of the pressurized medium chamber housing is rough;

(b) the gas ejecting hole is oriented such that combustion gas ejected from the gas ejecting hole does not strike against an inner wall surface of a pressurized medium chamber housing in the shortest distance; and (c) a barrier member is disposed in the vicinity of the gas ejecting hole, and combustion gas ejected from the gas ejecting hole moves after it strikes against the barrier member.

Since the above-described inventions are provided with the requirements (a) to (c), the following advantageous effects (4) to (6) can be obtained in addition to the advantageous effects (2) and (3).

Advantageous Effect (4)

As described in the requirement (a), when the inner wall surface of the pressurized medium chamber housing is rough, the combustion residues are more easily caught and arrested by uneven parts of the rough surface, so that discharging of the combustion residues is suppressed.

In order to enhance the advantageous effect (4), in the requirement (a), preferably, the inner wall surface of the pressurized medium chamber housing forming the pressurized medium chamber is provided with a groove(s) formed continuously or intermittently in the circumferential direction (preferably, its depth is not less than 0.1 mm, and more preferably, not less than 0.2 mm). By forming such a groove, the housing weight can be reduced corresponding to the groove.

Advantageous Effect (5)

As described in the requirement (b), by restricting the opening direction of the gas ejecting hole provided in the cap, the number of contacts of the combustion gas and the wall surface can be increased (that is, a contacting time can be elongated), so that the combustion residues easily adhere to the wall surface, and discharging of the combustion residues outside the inflator is suppressed.

In order to enhance the advantageous effect (5), in the requirement (b), the gas ejecting hole may be provided in a side surface of the cap to be oriented towards the gas generator; the gas ejecting hole may be provided in a side surface of the cap and a member for circumferentially restricting the ejecting direction of combustion gas from the gas ejecting hole is provided; and the gas ejecting hole may be provided in an end surface of the cap and a member for circumferentially restricting the ejecting direction of combustion gas from the gas ejecting hole may be provided Advantageous Effect (6)

As described in the requirement (c), combustion gas ejected from the gas ejecting hole strikes against the barrier member, and therefore, combustion residues first adhere to the barrier member to be arrested. A flow of the combustion gas is disturbed by striking against the barrier member, so that the number of times of contacts of combustion gas and the wall surface can be increased (that is, the contacting time can be elongated), and consequently, the advantageous effect (5) is also obtained substantially and discharging of the combustion residues outside the inflator is suppressed.

In order to enhance the advantageous effect (6), in the requirement (c), the following aspects can be employed;

The barrier member may be cylindrical, one end thereof may be integrated with the end surface of the cap and closed, the other end may be opened, and a side surface may be formed to face, with a gap, the gas ejecting hole provided in a side surface of the cap, and such that the combustion gas moves from the opened end after the combustion gas strikes against an inner wall of the side surface on the cylindrical member.

The barrier member may be disk-shaped, integrated with end surface of the cap and may be extended from the end surface of the cap towards an inner wall surface of the pressurized medium chamber housing, and after the combustion gas ejected from the gas ejecting hole provided in the side surface of the cap strikes against a peripheral edge portion of the barrier member, such that it moves from a clearance between the inner wall surface of the pressurized medium chamber housing and the peripheral edge portion of the barrier member.

The barrier member may be disk-shaped, integrated with the end surface of the cap and may be extended from the end surface of the cap towards an inner wall surface of the pressurized medium chamber housing to make a peripheral edge portion thereof abut on the inner wall surface, a gas passing port may be provided in the peripheral edge portion of the barrier member and a member for circumferentially restricting an ejecting direction of gas from the gas passing port may be provided, and combustion gas ejected from the gas ejecting hole provided in the side surface of the cap may be ejected from the gas passing port.

The inflator of the above-described invention can be provided with the requirements (a) and (b), the requirements (a) and (c), the requirements (b) and (c), or the requirements (a), (b), and (c).

Further, in the inflator of the above-described invention, the cap may have a flange portion formed by bending an opening peripheral edge portion outwardly and the gas generator housing may be fixed at the flange portion by crimping part of the gas generator housing.

Further, in the inflator of the above-described invention, a pressurized medium charging hole may be formed in a side surface of the pressurized medium chamber housing, and the charging hole may be closed by a pin after the pressurized medium is charged. In the inflator of the above-described invention, the pin may be protruding into the pressurized medium chamber and a protruding portion thereof may have such a length that combustion gas flow of the gas generating agent strikes against the protruding portion. By securing some length in the protruding portion of the pin in this manner, combustion gas may be made to strike against the pin so that the combustion residues adhere to the pin.

Also in the above-described invention, the advantageous effect (1) can further be exhibited by using a gas generating agent in which a melting point of the combustion residue generated by combustion of the gas generating agent is not less than a discharging temperature of gas generated from the gas generating agent.

In the above-described invention, the pressurized medium chamber housing may be symmetrical in the axial and radial directions. By employing such a symmetrical shape, the orientation of the pressurized medium chamber housing does not have to be adjusted at a time of assembly, so that an assembling work is facilitated.

In the above-described invention, the gas generator housing and the pressurized medium chamber housing may be connected by resistance-welding.

The gas generating agent used in the present invention can be determined in relation with composition of the pressurized medium as follows:

The pressurized medium comprises an inert gas such as argon or helium (nitrogen is also included in the inert gas in the present invention). When the pressurized medium has a composition which does not substantially include oxygen, the argon works to promote the thermal expansion of the pressurized medium, and helium is preferably contained because the leakage of the pressurized medium can be detected easily, and consequently, distribution of imperfect products can be prevented. Also, a preferable pressurized medium does not include oxygen, but oxygen may be included to promote combustion of the gas generating agent. In case of including oxygen, an amount of addition thereof is preferably 10 mole % or less, more preferably 5 mole % or less. A charging pressure of the pressurized medium is preferably 10,000 to 70,000 kPa, more preferably 30,000 to 60,000 kPa.

As the gas generating agent, for example, it is possible to use a material including fuel and oxidizing agent, or fuel, oxidizing agent, and slag-forming agent, being mixed with binder if required, and formed into a desired shape. If such a gas generating agent is used, a gas generated by combustion of the agent can be used for inflating and developing an air bag together with the pressurized medium. Especially, when the gas generating agent including the slag-forming agent is used, slag is easily made, so that an amount of mist-like combustion residues discharged from the inflator can be largely reduced. However, in case of reducing a charged amount of gas generating agent and generated residues, it is unnecessary to use a slag-forming agent.

A preferable fuel can be one or at least two selected from the group consisting of guanidine derivatives such as nitroguanidine (NQ), guanidine nitrite (GN), guanidine carbonate, amino nitroguanidine, amino guanidine nitrite, amino guanidine carbonate, diamino guanidine nitrite, diamino guanidine carbonate, and triamino guanidine nitrite. As fuel, one or at least two selected from the group consisting of tetrazole and tetrazole derivatives can be used.

As the oxidizing agent, one or at least two selected from the group consisting of strontium nitrate, potassium nitrate, ammonium nitrate, potassium perchlorate, copper oxide, ferrous oxide, a basic copper nitrate are preferably used.

As the slag-forming agent, one or at least two selected from the group consisting of acid clay, talc, bentonite, diatomaceous earth, kaolin, silica, alumina, sodium silicate, silicone nitride, silicon carbide, hydrotalsite, and a mixture thereof are preferably used.

As the bonding agent, at least one selected from the group consisting of sodium salt of carboxymethylcellulose, hydroxyethyl cellulose, starch, polyvinyl alcohol, guar gum, microcrystal cellulose, polyacrylamide and calcium stearate are preferably used.

When the pressurized medium and the gas generating agent composed in the above manner are used, a mole ratio (A/B) of an amount of the pressurized medium (A moles) and an amount of the gas generated by combustion of the gas generating agent (B moles) is adjusted to preferably 0.2 to 10, more preferably 0.4 to 4. The mole ratio A/B may be described as a mole ratio A1/A2 in the following explanation.

By adjusting the mole ratio of an amount of the pressurized medium and an amount of the gas generated by combustion of the gas generating agent in this manner, a delay in rising of an inflator internal pressure can be prevented and an excessive rising of an internal pressure of the inflator can be prevented. Thus, an internal pressure of the inflator can be controlled at a time of combustion of the gas generating agent, and thereby, the volume of the pressurized medium chamber housing is reduced (that is, the length and/or the width (diameter) of the pressurized medium chamber housing is reduced), and even if the internal pressure rises correspondingly, an internal pressure of the inflator at a time of combustion can be prevented from rising excessively. Incidentally, in the inflator of the present invention, a weight ratio (X/Y) of a weight (X) of the pressurized medium and a weight (Y) of the gas generating agent is preferably 0.1 to 7, more preferably 0.5 to 5. The weight ratio (X/Y) may be described as a mass ratio B1/B2 in the following explanation.

The gas generating agent used in the present invention can include 20 to 60 mass % of nitroguanidine as the fuel and 80 to 40 mass % of the oxidizing agent, and preferably, 30 to 40 mass % of nitroguanidine as the fuel and 70 to 60 mass % of strontium nitrate as the oxidizing agent. Further, the bonding agent (sodium carboxymethylcellulose or the like) and the slag-forming agent (acid clay or the like) can further be mixed in addition to the fuel and the oxidizing agent. In this case, it is preferable that the fuel is 20 to 60 mass %, the oxidizing agent is 40 to 65 mass %, the bonding agent is 3 to 12 mass % (preferably 4 to 12 mass %), and the slag-forming agent is 1 to 20 mass % (preferably 3 to 7 mass %).

According to the inflator of the present invention, combustion residues contained in the combustion gas of the gas generating agent can be suppressed from being discharged outside the inflator.

Next, the present invention (II-1) provides, as one means for solving the problem, an inflator in which an air bag is inflated with combustion gas due to combustion of a gas generating agent and pressurized gas, comprising a pressurized gas chamber which has a outer shell formed by a cylindrical pressurized gas chamber housing and is filled with pressurized gas, a gas generator which is connected to the pressurized gas chamber and includes ignition means and a gas generating agent accommodated in a gas generator housing, and a diffuser portion which is connected to a different portion from the pressurized gas chamber, a first rupturable plate closing between the pressurized gas chamber and the gas generator, and a second rupturable plate closing between the pressurized gas chamber and the diffuser portion, wherein the diffuser portion is a cap having a plurality of gas discharging holes through which gas passes, and at least one of pieces produced by the broken first and second rupturable plates and residues (combustion residues) contained in combustion gas generated by combustion of the gas generating agent is prevented from flowing outside the inflator.

In this invention, any aspect can be employed such that the diffuser portion is a cap, or that a cap is disposed inside the diffuser portion, and further, the aspect in which the diffuser portion is fixed by welding to the pressurized gas chamber housing, or the aspect in which the diffuser portion is integrated with the pressurized gas chamber housing can be employed.

In this invention, the diffuser portion removes either or both of pieces of the broken first and second rupturable plates and a combustion residue to prevent them from flowing outside the inflator or to reduce an outflow amount thereof.

In an inflator of the present invention (II-2), a cap, having a plurality of gas discharging holes through which gas passes and preventing at least one of pieces of the broken first rupturable plate and combustion residues of the gas generating agent from flowing outside the inflator, is disposed inside the pressurized gas chamber to cover the first rupturable plate from the pressurized gas chamber side.

In this invention, broken pieces produced by breaking of the first rupturable plate and combustion residues are removed by the cap disposed inside the pressurized gas chamber, thereby preventing them from flowing outside the inflator or to reduce an outflow amount thereof.

In an inflator of the present invention (II-3), a cap, having a plurality of gas discharging holes through which gas passes and preventing at least one of pieces of the broken first rupturable plate and combustion residues of the gas generating agent from flowing outside the inflator, is disposed inside the pressurized gas chamber to cover the first rupturable plate from the pressurized gas chamber side.

In this invention, pieces produced by breaking of the first rupturable plate and combustion residues are removed by the cap disposed inside the pressurized gas chamber, thereby preventing them from flowing outside the inflator or to reduce an outflow amount thereof.

It is preferable that the cap of the above-described invention comprises a cylindrical member having one end opened and the other end closed, and has a plurality of gas discharging holes in at least a peripheral surface thereof.

In the cap of the above-described invention, preferably, the relationship between a distance L between a closed end surface of the cap and a gas discharging hole nearest to the closed end surface and a diameter D of the rupturable plate satisfies the following formula: $L \geq D/2$. In this case, the distance L is preferably 3 to 8 mm, more preferably 4 to 8 mm, and most preferably 5 to 8 mm.

The diameters of a plurality of the gas discharging holes in the cap of the above-described invention are preferably 0.5 to 2 mm and more preferably 0.5 to 1.2 mm, and the total opening area of a plurality of ejecting holes in a screen is preferably 20 to 1000 $mm^2$ and more preferably 100 to 500 $mm^2$.

It is preferable that the cap of the above-described invention is disposed such that the axial direction of the cap and the axial direction of the pressurized gas chamber housing coincide with each other.

With the above-described cap of the invention, the following advantageous effects (IIa) to (IIc) can be obtained.

(IIa) When the cap is disposed such that the axial direction the cap and the axial direction of the pressurized gas chamber housing coincide with each other, pressurized gas strikes against the closed end surface of the cap and then changes its flow direction to flow out from the ejecting holes in the peripheral surface. Because the gas changes its outflow direction, foreign materials (pieces of the broken rupturable plate or the like) easily remain in a pocket portion from the closed end surface of the screen to the ejecting hole nearest thereto. Incidentally, by mounting the screen at the flange portion in the above manner, no gap is produced between the screen and an inner wall of a gas discharging port, and foreign materials are prevented from flowing out without passing through the screen.

(IIb) When the inflator is actuated and the rupturable plate is broken by activation of an igniter, a central portion of the rupturable plate is positioned near to the igniter and a pressure of the pressurized medium applied from the opposite side becomes the maximum at the central portion, and therefore, the rupturable plate is liable to be broken from the central portion in any event. For this reason, the maximum length of the foreign material produced by breaking the rupturable plate has a length corresponding to a radius of the rupturable plate. Thereby, as described above, if the relationship of $L \geq D/2$ is satisfied, the depth (L) of the pocket portion becomes equal to or more than the length (D/2) of the foreign materials, so that the foreign materials become easier to remain in the pocket portion. That is, the above-described advantageous effect (IIa) is further enhanced.

(IIc) Since the pressurized medium enters from the opening of the screen to be discharged through the ejecting hole on the peripheral surface, foreign materials contained in the pressurized medium is prevented from escaping outside the inflator, and at the same time, outflow pressure of the pressurized medium is also controlled. Further, by controlling the outflow pressure (an outflow amount per unit time) of the pressurized medium with the screen at a time of actuation, the outflow pressure of the pressurized medium is prevented from being influenced by broken state of the rupturable plate.

The present invention (II-10) provides an inflator according to any one of the inflators described in the above (II), including means for changing the flow direction of the combustion gas by the cap, making combustion residues contained in the combustion gas adhere to one or at least two portions of the wall surface, further making the combustion gas contact with the pressurized gas, and cooling and solidifying the combustion residues contained in the combustion gas due to a temperature difference, wherein the melting point of the combustion residues generated due to combustion of the gas generating agent is equal to or more than a discharging temperature of a gas generated from the gas generating agent.

In the present invention (II-10), the advantageous effects (1) to (3) of the above-described invention (I) can be obtained in addition to the above-described operations (IIa) to (IIc).

Further, in the present invention (II-10), with the first rupturable plate closing between the pressurized gas chamber housing and the gas generator, a sufficient temperature difference can be obtained between the combustion gas and the pressurized gas and a solidifying action of the combustion residues can be exhibited even when the gas generating agent is burnt. Accordingly, even when the inflator is left in a high temperature (for example, inside an automobile including an air bag apparatus provided with an inflator, in the summer), the temperature of the pressurized gas becomes remarkably lower than the discharged gas temperature of the gas generating agent so that the solidifying action of the combustion residue is exhibited. However, without the first rupturable plate, the pressurized gas is heated by combustion heat of the gas generating agent, and thereby, the temperature difference between the pressurized gas and the discharge gas becomes small, so that the solidifying action of the combustion residue is weaken.

Also, since the gas generating agent is kept under a normal pressure, its deterioration due to pressure is smaller than that in case of being kept under a high pressure. Further, since the cap having the gas discharging hole in at least one of the side surface and the end surface is provided, combustion gas easily strikes against the wall surface of the pressurized gas chamber housing. Incidentally, in order to enhance the arresting effect of the combustion residues, a cap can also be provided on the second rupturable plate side.

The invention (II-11) provides the inflator according to any one of the inflators described in the above invention (II) and further provided with at least one selected from the requirements (a), (b), and (c) of the above invention (I).

Since the present invention is provided with at least one selected from the requirements (a), (b), and (c), the above advantageous effects (4) to (6) can be obtained in addition to the advantageous effects (2) and (3). A plurality of combinations can be applied to the requirements (a), (b), and (c) as in the above (I).

Further, in the invention (II), the cap may have a flange portion and may be fixed as in the invention (I).

Further, in the invention (ii), a pressurized-medium charging hole, a pin, and a protruding portion may be provided as in the invention (I).

Also in the invention (II), the advantageous effect (1) can be exhibited as in the above (I). Further, a relationship among the pressurized gas chamber housing, joining of the gas generator housing and the pressurized gas chamber housing, compositions of the gas generating agent and pressurized gas can be provided as in the invention (I).

The gas generating agent and the pressurized gas used in the present invention (II) is similar to those in the invention (I).

By adjusting the mole ratio of an amount of the pressurized gas and an amount of gas generated by combustion of the gas generating agent in the above manner, a charging amount of the pressurized gas can be reduced. Thereby, even when a volume of the pressurized gas chamber housing is reduced (that is, a length and/or a width (diameter) of the pressurized gas chamber housing is reduced), the same pressure as that before a volume is reduced can be maintained without increasing a charging pressure of the pressurized gas (=the internal pressure in the pressurized gas chamber housing). Incidentally, in the inflator of the present invention, the weight ratio (X/Y) of the weight (X) of the pressurized gas and the weight (Y) of the gas generating agent is preferably 0.1 to 7, and more preferably 0.5 to 5.

According to the inflator of the present invention, pieces of the broken rupturable plate contained in a gas and combustion residues contained in combustion gas generated by the gas generating agent can be prevented from being discharged outside the inflator.

Further, an object of the present invention (III) is to provide an inflator in which size and weight is reduced without losing functions of the inflator, and an air bag system using the same.

If an inflator utilizing pressurized gas and combustion gas of a gas generating agent is made compact, maintaining a required charged amount of the pressurized gas (a charging amount required for inflating an air bag), an internal pressure rises because of the reduced internal volume. If the gas generating agent is burnt under a high pressure with the rising of the internal pressure, the internal pressure further rises due to generation of a high temperature combustion gas to exceed pressure resistance of the inflator or to raise a burning velocity of the gas generating agent excessively. As a result, flowing speed of the gas becomes too high to keep an inflating timing of an air bag within an optimal time for protecting an occupant.

However, when the requirements (1) to (6) determined in the invention (III) are provided and these requirements act in mutual relation, even in the compact inflator with rising internal pressure, the same operation as that before it is compact can be secured without causing the above problems.

The invention of the invention (III-1) provides, as one solving means, an inflator in an air bag is inflated by pressurized gas and combustion gas of a gas generating agent, provided with the following requirements (1) to (6).

In other words, the invention (III-1) is an inflator for inflating an air bag with pressurized gas and combustion gas generated by combustion of the gas generating agent, and provided with the following requirements (1) to (6);

(1) pressurized gas contains an inert gas but does not substantially contain oxygen;

(2) in the gas generating agent, a pressure index obtained by the following formula: $rb=\alpha P^n$ (in the formula, rb: burning velocity, $\alpha$: coefficient, P: pressure, and n: pressure index) is 0.8 or less;

(3) a ratio A1/A2 of an amount (mole number) of pressurized gas (A1) and an amount (mole number) of gas generated by combustion of a gas generating agent (A2) is 1 to 20;

(4) a ratio B1/B2 of a mass (B1) of pressurized gas (B1) and a mass (B2) of a gas generating agent is 1 to 20;

(5) a mass of a gas generating agent is 0.5 to 30 g; and (6) a charging pressure of pressurized gas is 30,000 to 67,000 kPa.

The following is the detailed description.

(1) Pressurized gas contains an inert gas but it does not substantially contain oxygen.

The pressurized gas comprises an inert gas such as argon or helium (nitrogen is also included in the inert gas in the present invention). When the pressurized gas has a composition which does not substantially include oxygen, the argon works to promote the thermal expansion of the pressurized gas, and helium is preferably included so that the leakage of the pressurized gas can be detected easily, and thereby, distribution of imperfect products can be prevented.

That the pressurized gas does not substantially contain oxygen means that oxygen is not included positively (intentionally) in the pressurized gas. There are cases where oxygen gas is mixed in the pressurized gas in a course of charging gas or that oxygen gas is mixed in an inert gas as impurity and can not be completely avoided, therefore, even when oxygen gas is contained in the pressurized gas for such a reason, it is also regarded that oxygen is not substantially contained. When oxygen is included in the pressurized gas, a burning velocity of a gas generating agent in the initial combustion stage rapidly rises to increase an internal pressure of the inflator. However, such an increase of an internal pressure of the inflator is avoided if the pressurized gas does not substantially include oxygen. When oxygen gas is contained in the pressurized gas, it is preferable that a content of oxygen gas is 3 mole % or less.

(2) In the gas generating agent, a pressure index obtained by the following formula: $rb=\alpha P^n$ (in the formula, rb: burning velocity, $\alpha$: coefficient, P: pressure, and n: pressure index) is 0.8 or less.

In the above invention, a pressure index (n) was obtained from two formula of $rb1=\alpha P1^n$ and $rb2=\alpha P2^n$ after the burning velocity rb1 in a tank of a pressure P1 (70 kg/cm$^2$) was measured and a burning velocity rb2 was measured in a tank of a pressure P2 (100 kg/cm$^2$).

By providing the requirement of a pressure index, rapid increase of a burning velocity in the initial stage of the combustion of the gas generating agent is prevented, so that increase of an internal pressure of the inflator is small. For this reason, even when the thickness of the inflator (the pressurized gas chamber housing) is decreased, a sufficient pressure-resistance can be maintained. Also, the gas generating agent is burnt stably because of the small increase (that is, a little change in the internal pressure) of the internal pressure of the inflator (pressure inside the pressurized gas chamber housing), so that combustion remnants do not occur. The pressure index (n) is preferably 0.1 to 0.8, and more preferably 0.1 to 0.8.

Such a requirement (2) can be provided by adjusting the composition of the gas generating agent.

In the requirement (2), when the pressure index exceeds 0.8, the sensitivity to a pressure of the gas generating agent becomes high, that is, a combustion is greatly affected by change in pressure, so that a numerical range in the following requirements (3) to (7) becomes narrow, which makes it difficult to conduct an adjustment for providing the respective requirements.

(3) A ratio A1/A2 of an amount (mole number) of pressurized gas (A1) and an amount (mole number) of gas generated by combustion of a gas generating agent (A2) is 1 to 20. A1/A2 is preferably 3 to 15, and more preferably 4 to 10.

When A1/A2 is not less than 1, delay of rising of an internal pressure of the inflator is prevented, and when A1/A2 is not more than 20, an excessive rising of an internal pressure of the inflator is prevented.

An amount (mole number) of the pressurized gas (A1) is 0.1 to 2.0 moles, preferably 0.1 to 1.5 moles and more preferably 0.15 to 1.5 moles, while a gas amount (mole number) generated by combustion of the gas generating agent (A2) is 0.01 to 0.2 moles, preferably 0.01 to 0.15 moles and more preferably 0.02 to 0.15 moles.

(4) A ratio B1/B2 of a mass (B1) of pressurized gas (B1) and a mass (B2) of a gas generating agent is 1 to 20. B1/B2 is preferably 3 to 15, and more preferably 4 to 10.

When B1/B2 is not less than 1, delay of rising of an internal pressure of the inflator is prevented, and when B1/B2 is not more than 20, an excessive rising of an internal pressure of the inflator is prevented.

The mass (B1) of the pressurized gas is 5 to 80 g, preferably 5 to 60 g, more preferably 10 to 60 g. A mass (B2) of the gas generating agent is described in the requirement (5).

(5) A mass of a gas generating agent is 0.5 to 30 g. An amount of the gas generating agent is preferably 1 to 20 g, more preferably 1 to 10 g.

(6) A charging pressure of pressurized gas is 30,000 to 67,000 kPa. The charging pressure of the pressurized gas is preferably 35,000 to 60,000 kPa, and more preferably 40,000 to 60,000 kPa.

When the charging pressure is not less than 30,000 kPa, a gas amount sufficient for inflating an air bag can be secured. When a charging pressure is not more than 67,000 kPa, even with rising of the internal pressure of the inflator due to combustion of the gas generating agent, a sufficient difference between a pressure-resistance upper limit of the inflator and an internal pressure of the inflator can be obtained, so that a range in controlling an internal pressure of the inflator can be made wider.

The inflator of the present invention (III-1) is provided with the requirements (1) to (6), and each requirement is mutually associated with each other. When the initial charging pressure is 60,000 kPa, the size of the inflator can be reduced by 50 mass % or so at maximum by reducing the width or the diameter and the length in order not to change pressure-resistance of the inflator.

Further, the inflator of the present invention (III-1) is provided with the requirements (1) to (6) and the internal pressure of the inflator can be controlled more precisely and in a narrower range as compared with the prior art, by mutually related action of the respective requirements. For this reason, a discharging time of a gas from the inflator can be easily controlled and an inflating and developing time of an air bag can be easily adjusted.

In the present invention (III-1), it is preferable in the requirement (2) that a combustion flame temperature of the gas generating agent is not more than 3000° C. The combustion flame temperature means a theoretical value of a flame temperature when the gas generating agent is burnt, and it is obtained by theoretical calculation.

When the combustion flame temperature of the gas generating agent becomes excessively high, the combustion gas temperature becomes high, and the pressurized gas temperature further becomes excessively high. Thereby, an internal pressure of the inflator rises, and also, a temperature of the gas that flows into the air bag becomes high. However, such a problem is prevented by setting the combustion flame temperature to the above-described temperature or less.

Further, if the combustion flame temperature exceeds 3000° C., optimal values (central values) in numerical ranges in the requirements (3) to (6) and the following requirement (7) are shifted such that the air bag inflating action due to combustion gas of the gas generating agent is decreased, and therefore, the inflator does not function as one utilizing both the pressurized gas and the combustion gas.

Also, the combustion flame temperature is related with the requirement (5) in particular. When the inflator is actuated and pressurized gas is discharged outside the inflator, the inside of the inflator is decompressed, so that the temperature lowers and the internal pressure lowers. In particular, since the combustion flame temperature is as low as not less than 3000° C., there may be a case where it takes too much time for discharging the entire gas because of lower gas discharging speed caused by lower internal pressure of the inflator due to the lower temperature. However, by setting the lower limit value of an amount of the gas generating agent to not less than 1 g, the internal pressure can be prevented from lowering due to lower temperature inside the inflator (that is, an internal pressure of the inflator can be controlled), so that the air bag can be inflated within an optimal time. Further, by setting the lower limit value of the gas generating agent amount to not less than 1 g, an internal pressure of the inflator can be controlled as described above but also a gas amount required for inflating an air bag can be supplied. The upper limit value is a numerical value obtained by considering the volume of a generally used inflator.

The combustion flame temperature is more preferably not more than 2500° C. and further preferably not more than 2200° C. It is preferable that the lower limit value of the combustion flame temperature is 900° C.

In the present invention (III-1) and the like, it is preferable in the requirement (2) that the gas generating agent is a non-azide gas generating agent.

Further, the inventions of the present invention (III-1) and the like are preferably provided with the requirement (7) such that a ratio A1/C of an amount (mole numbers) of the pressurized gas (A1) and the total surface area ($cm^2$) of the gas generating agent (C) is 0.004 to 0.05 mole/$cm^2$. A1/C is more preferably 0.004 to 0.04 moles/$cm^2$, and further preferably 0.004 to 0.03 moles/$cm^2$.

When A1/C is not less than 0.004 mole/$cm^2$, a ratio of the pressurize gas amount and the gas generating agent falls in a proper range, and thereby, delay in rising of an internal pressure of the inflator is prevented. (Alternatively, the inflator is prevented from being broken due to an excessive rising of an internal pressure of the inflator). When A1/C is not more than 0.05 mole/$cm^2$, the ratio of the pressurized gas amount and the gas generating agent falls in the proper range, and thereby, an excessive rising of an internal pressure of the inflator is prevented (alternatively, delay of a rising of an internal pressure of the inflator is prevented.)

The total surface area ($cm^2$) of the gas generating agent (C) is preferably 10 to 150 $cm^2$, more preferably 20 to 120 $cm^2$, and further preferably 30 to 100 $cm^2$.

Further, the present invention (III-1) and the like is preferably provided with the requirement (8) such that a ratio C/E of the total surface area ($cm^2$) of the gas generating agent (C) and the total area ($cm^2$) of the gas discharging hole (E) is 0.5 to 4. C/E is preferably 0.5 to 3.5, and further preferably 0.5 to 3.0.

When C/E is not less than 0.5, the entire charged pressurized gas is not discharged until combustion of the gas generating agent is completed, so that the combustion of the gas generating agent is stabilized. When C/E is not more than 4, an internal pressure of the inflator is maintained in a proper range, and therefore, there is no risk such that the inflator is broken.

The total area ($cm^2$) of the gas discharging holes (E) is preferably 5 to 100 $cm^2$, more preferably 10 to 80 $cm^2$, and further preferably 15 to 60 $cm^2$.

The numerical range of each single requirement shown with A1, A2, B1, B2, C, and E is a numerical range suitable in case of each independent requirement, and the range of a ratio in case of combining the requirements and the numerical range of each single requirement may not correspond to each other. For example, a ratio of the lower limit value or the upper limit value of A1 and the lower limit value or the upper limit value of A2 may not coincide with a ratio of the lower limit value or the upper limit value of A1/A2. In order to solve the problem by the invention, a numerical value may be selected from the numerical range of the respective requirements (A1, A2 and the like) to achieve a desired value within the range of a ratio in case of combining the respective requirements (A1, A2 and the like).

In the present invention (III-1), the inflator has a pressurized gas chamber defined by an outer shell formed of a cylindrical pressurized gas chamber housing and is charged with pressurized gas, and an outer diameter of the pressurized gas chamber housing is preferably 40 mm or less. The outer diameter of the pressurized gas chamber housing is more preferably not more than 35 mm, and further preferably not more than 30 mm.

In the present invention (III-1) and the like, the inflator has a pressurized gas chamber defined by an outer shell formed of a cylindrical pressurized gas chamber housing and is charged with pressurized gas, and a ratio (L/D) of an outer diameter (D) and a length (L) of the pressurized gas chamber housing is preferably 1 to 10, more preferably 2 to 10.

Preferably in the present invention (III-1) and the like, the inflator has a pressurized gas chamber defined by an outer shell formed by a cylindrical pressurized gas chamber housing and is charged with pressurized gas, and the pressurized gas chamber housing is symmetrical regarding the axial and radial directions.

By making the pressurized gas housing symmetrical, an orientation does not have to be determined at a time of assembly, so that manufacturing is facilitated.

Preferably in the present invention (III-1) and the like, the inflator has a pressurized gas chamber defined by an outer shell formed of a cylindrical pressurized gas chamber housing and is charged with pressurized gas, and the pressurized gas chamber housing is symmetrical regarding the axial and radial directions and both end sides thereof are reduced in diameter. That "both ends side are reduced in diameter" means that diameters at both ends of the pressurized gas chamber housing are made smaller than diameters of the other portion thereof.

By making the pressurized gas housing symmetrical, an orientation does not have to be determined at a time of assembly, so that manufacturing is facilitated. Further, when both ends are reduced in diameter, joining to another member can be facilitated, in particular, manufacturing in case of joining with resistance-welding is improved.

Preferably in the present invention (III-1) and the like, the inflator has a pressurized gas chamber defined by an outer shell formed of a cylindrical pressurized gas chamber housing and is charged with pressurized gas, and a pressurized gas charging hole is formed in a side surface of the pressurized gas chamber housing, and the hole is closed by a pin after the pressurized gas is charged.

Since the pressurized gas charging hole is formed and closed by the pin in this manner, another members can be connected to both end sides of the pressurized gas chamber housing.

Preferably in the present invention (III-1) and the like, the pin is protruding into the pressurized gas chamber housing and a protruding portion thereof has such a length that combustion gas flow of the gas generating agent strikes against the protruding portion. By the foregoing structure, it is possible to make combustion residue strike against and adhere to the pin, so that the combustion chamber can be arrested.

Preferably in the present invention (III-1) and the like, the inflator has a pressurized gas chamber defined by an outer shell formed of a cylindrical pressurized gas chamber housing and is charged with pressurized gas, a gas generator in which an outer shell is formed by a gas generator housing and the ignition means and the gas generating agent are accommodated, and a diffuser portion, wherein the gas generator housing is connected to one end of the pressurized gas chamber housing and the diffuser portion is connected to the other end of the pressurized gas housing, and a first rupturable plate closes between the pressurized gas chamber and the gas generator and a second rupturable plate closes between the pressurized gas chamber and the diffuser portion.

Preferably in the present invention (III-1) and the like, a cap having a gas ejecting hole provided on at least one of a side surface and an end surface thereof, particularly on the side surface covers the first rupturable plate from the pressurized gas chamber side. By disposing such a cap, an arresting effect for the combustion residue is enhanced.

Preferably in the present invention (III-1) and the like, the gas generator housing and the pressurized gas chamber housing, and the diffuser portion and the pressurized gas chamber housing are connected by resistance-welding.

Preferably in the present invention (III-1) and the like, outer diameters of the pressurized gas chamber housing, the gas generator housing and the diffuser portion are equal or approximate to one another.

In the present invention (III-15), the inflator has a pressurized gas chamber in which an outer shell is formed by a cylindrical pressurized gas chamber housing and is charged with pressurized gas, a gas generator in which an outer shell is formed by a gas generator housing and the ignition means and the gas generating agent are accommodated, and a diffuser portion, wherein the gas generator housing is connected to one end of the pressurized gas chamber housing and the diffuser portion is connected to the other end of the pressurized gas housing, and a first rupturable plate closes between the pressurized gas chamber and the gas generator and a second rupturable plate closes between the pressurized gas chamber and the diffuser portion, and outer diameters of the pressurized gas chamber housing, the gas generator housing and the diffuser portion are equal or approximate to one another.

This is an inflator in which an air bag is inflated by using pressurized gas, the pressurized gas is charged in a pressurized gas chamber defined by an outer shell formed of a cylindrical pressurized gas chamber housing, wherein the pressurized gas chamber housing is symmetrical regarding the axial and radial directions, and both ends thereof are reduced in diameter.

That "both ends side are reduced in diameter" means that diameters at both ends of the pressurized gas chamber housing are made smaller than diameters of the other portion thereof.

By making the pressurized gas housing symmetrical, an orientation does not have to be determined at a time of assembly, so that manufacturing is improved. Further, when both ends are reduced in diameter, joining to another member can be facilitated, in particular, manufacturing in case of joining with resistance-welding is improved.

Preferably in the present invention (III-15), an inflator uses combustion gas obtained by combustion of a gas generating agent together with pressurized gas as an inflating means for an air bag, wherein the inflator has a pressurized gas chamber defined by an outer shell formed of a cylindrical pressurized gas chamber housing and is charged with pressurized gas, a gas generator for generating a combustion gas and a diffuser portion having a gas discharging port, and the pressurized gas chamber housing is symmetrical regarding the axial and radial directions and both end sides thereof are reduced in diameter.

Preferably in the above-described invention, a gas generator in which an outer shell is formed by a gas generator housing and the ignition means and the gas generating agent are accommodated, the gas generator housing is connected to one end of the pressurized gas chamber housing and the diffuser portion is connected to the other end of the pressurized gas housing, and a first rupturable plate closes between the pressurized gas chamber and the gas generator and a second rupturable plate closes between the pressurized gas chamber and the diffuser portion.

In this invention, combustion gas generated inside the gas generator flows into the pressurized gas chamber after the first rupturable plate is broken, and thereafter the combustion gas is discharged from the gas discharging hole of the diffuser portion together with the pressurized gas after the second rupturable plate is broken, thereby inflating an air bag.

Preferably in the above-described invention, at least one of a set of the gas generator housing and the pressurized gas chamber housing, and a set of the diffuser portion and the pressurized gas chamber housing are connected by resistance-welding.

Preferably in the present invention (III-15), an inflator substantially uses only pressurized gas as an inflating means for an air bag, and the inflator comprises a pressurized gas chamber defined by an outer shell formed of a cylindrical pressurized gas chamber housing and pressurized gas is charged, and a diffuser portion which is connected to the pressurized gas chamber and has a gas discharging hole, a rupturable plate closing between the pressurized gas chamber and the diffuser portion, and an igniter accommodated inside the diffuser portion as a rupturable means of the rupturable plate, the pressurized gas chamber housing is symmetrical regarding the axial and radial directions and both ends thereof are reduced in diameter.

In this invention, the rupturable plate is broken by actuation of the igniter (e.g., an electrical type igniter provided with a priming) and the pressurized gas is discharged from the gas discharging hole of the diffuser portion, thereby inflating the air bag. A small amount of combustion gas is generated by actuation of the igniter, but this combustion gas itself does not substantially participate in inflation of the air bag, so that the inflating means for the air bag is substantially only the pressurized gas.

Preferably in the above-described invention, a cylindrical gas discharging port connected to the gas discharging hole of the diffuser portion is provided, the gas discharging port is mounted to coincide with the axial direction of the pressurized gas chamber housing, and the pressurized gas discharged from the gas discharging hole passes through the gas discharging port and is discharged from an opening provided in the gas discharging port to inflate the air bag.

By providing such a gas discharging port, the axial direction of the pressurized gas chamber housing and the discharging direction of the pressurized gas coincide with each other, and the axial direction of the pressurized gas chamber housing and an inflating direction of the air bag coincide with each other, so that mounting an air bag is facilitated.

Preferably in the above-described invention, the diffuser portion and the pressurized gas chamber housing are connected by resistance-welding.

Also, the present invention (III-22) provides an air bag system comprising activation-signal outputting means including an impact sensor and a control unit, and a module case in which any one of the above-described inflators and an air bag are accommodated.

The present invention (III-22) is an inflator in which an air bag is inflated by using pressurized gas, the pressurized gas is charged in a pressurized gas chamber defined by an outer shell formed of a cylindrical pressurized gas chamber housing, the pressurized gas chamber housing is symmetrical regarding the axial and radial directions and both ends thereof are reduced in diameter, only the pressurized gas is substantially used as an inflating means for an air bag, wherein the inflator comprises a pressurized gas chamber defining an outer shell formed of a cylindrical pressurized gas chamber housing, and a pressurized gas charged inside the pressurize gas chamber, a diffuser portion connected to the pressurized gas chamber and having a gas discharging hole, a rupturable plate closing the pressurized gas chamber and the diffuser portion, and an igniter accommodated inside the diffuser portion as a rupturing means for the rupturable plate, the pressurized gas chamber housing is symmetrical regarding the axial and radial directions, and both ends thereof are reduced in diameter, a cylindrical gas discharging port connected to the gas discharging hole of the diffuser portion is provided, the gas discharging port is mounted to coincide with the axial direction of the pressurized gas chamber housing, and pressurized gas discharged from the gas discharging hole passes through the gas discharging port and is discharged from an opening provided in the gas discharging port to inflate an air bag, and the diffuser portion and the pressurized gas chamber housing are connected by resistance-welding.

It is preferable that the gas generating agent used in this invention is non-azide gas generating agents, and the gas generating agent can be decided in relation to composition of the pressurized gas as follows.

As the gas generating agent, for example, it is possible to use a material including fuel and oxidizing agent, or fuel, oxidizing agent and slag-forming agent, being mixed with binder if required, and formed into a desired shape. If such a gas generating agent is used, a gas generated by combustion of the agent can be used for inflating and developing an air bag together with the pressurized medium. Especially, when the gas generating agent including the slag-forming agent is used, slag is easily made, so that an amount of mist-like combustion residues discharged from the inflator can be largely reduced. However, in case of reducing a charged amount of gas generating agent and generated residues, it is unnecessary to use a slag-forming agent.

An example of the fuel can be at least one selected from the group consisting of triazine derivatives, tetrazole derivatives, triazole derivatives, guanidine derivatives, azodicarbonamide derivatives, and hydrazine derivatives are preferably used.

As triazine derivatives, at least one selected from the group consisting of triazine (1,2,3-triazine, 1,2,4-triazine, 1,3,5-triazine), melamine, trihydrazinotriazine, trimethylol melamine, alkylated methylol melamine, cyanuric acid derivatives such as ammeline, ammelide, ammeland, cyanuric acid or cyanurate esters, a nitric acid salt of melam, melem or melamine, a perchloric acid salt of melamine and nitro-melamine compound such as dinitroameline.

An example of tetrazole derivatives, triazole derivates, azodicarbonamide derivates and hydrazine derivates can be one or at least two selected from the group consisting of 5-oxo-1,2,4-triazole, tetrazole, 5-aminotetrazole, 5,5'-bi-1H-tetrazole, biuret, azodicarbonamide, carbohydrazide, carbohydrazide nitrate complex, dihydrazide oxalate and hydrazine-nitrate complex.

An example of guanidine derivatives can be at least one selected from the group consisting of nitroguanidine (NQ), guanidine nitrate (GN), guanidine carbonate, aminonitroguanidine, aminoguanidine nitrate, aminoguanidine carbonate, diaminoguanidine nitrate, diaminoguanidine carbonate, triaminoguanidine nitrate and the like.

As the oxidizing agent, at least one selected from the group consisting of strontium nitrate, potassium nitrate, ammonium nitrate, potassium perchlorate, copper oxide, ferrous oxide, a basic copper nitrate are preferably used.

As the slag-forming agent, at least one selected from the group consisting of acid clay, talc, bentonite, diatomaceous earth, kaolin, silica, alumina, sodium silicate, silicone nitride, silicon carbide, hydrotalsite, and a mixture thereof are preferably used.

As the bonding agent, at least one selected from the group consisting of sodium salt of carboxymethylcellulose, hydroxyethyl cellulose, starch, polyvinyl alcohol, guar gum, microcrystal cellulose, polyacrylamide and calcium stearate are preferably used.

The gas generating agent used in the present invention may include 20 to 60 mass % of nitroguanidine as the fuel and 80 to 40 mass % of the oxidizing agent, and preferably, 30 to 40 mass % of nitroguanidine as the fuel and 70 to 60 mass % of strontium nitrate as the oxidizing agent. Further, the bonding agent (sodium carboxymethylcellulose or the like) and the slag-forming agent (acid clay or the like) can further be mixed in addition to the fuel and the oxidizing agent. In this case, it is preferable that the fuel is 20 to 60 mass %, the oxidizing agent is 40 to 65 mass %, the bonding agent is 3 to 12 mass % (preferably 4 to 12 mass %), and the slag-forming agent is 1 to 20 mass % (preferably 3 to 7 mass %).

According to the inflator of the present invention, the inflator can be compact while securing a charged amount of pressurized gas approximately equal to that in the conventional inflator. Also in that case, an internal pressure of the inflator can be controlled appropriately at a time of actuation, so that an inflating performance of an air bag can be maintained in an optimal state.

DETAILED DESCRIPTION OF THE INVENTION

Embodiment 1

Figure 1:
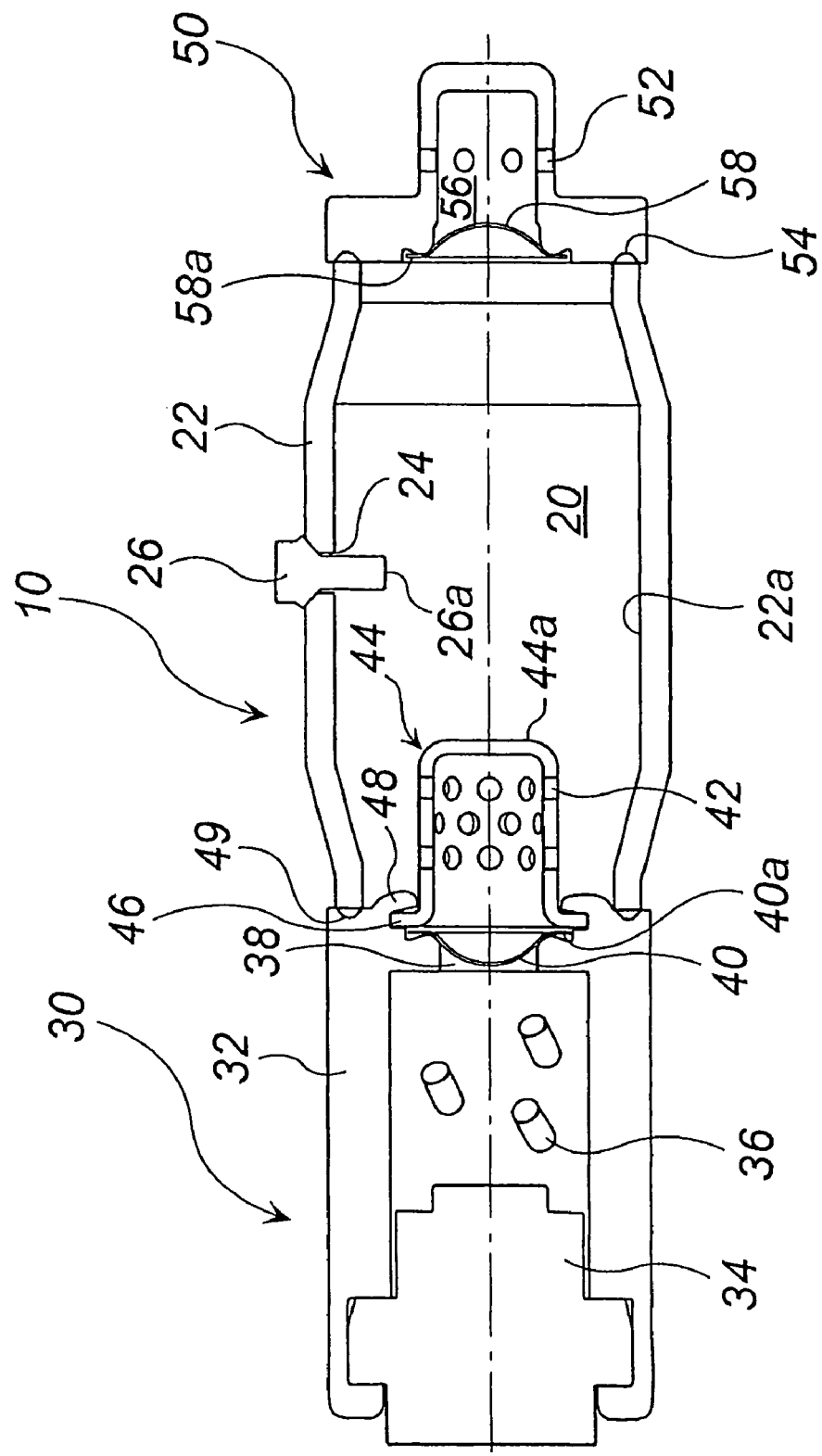
FIG. 1 is a sectional view of an inflator in the axial direction.

One embodiment will be explained with reference to FIG. 1. FIG. 1 is a sectional view of an inflator in the axial direction thereof.

An inflator 10 comprises a pressurized medium chamber 20, a gas generator 30, and a diffuser portion 50.

The pressurized medium chamber 20 has an outer shell formed by a cylindrical pressurized medium chamber housing 22 and it is charged with a pressurized medium comprising a mixture of argon and helium. Since the pressurized medium chamber housing 22 is made symmetrical in the axial direction and a radial direction thereof, it is unnecessary to adjust the orientation in the axial and radial directions at a time of assembling.

A charging hole 24 of a pressurized medium is formed on a side surface of the pressurized medium chamber housing 22, and it is closed by a pin 26 after the pressurized medium is charged. A distal end portion 26a of the pin 26 protrudes into the pressurized medium chamber 20, and the protruding portion thereof has such a length that the flow combustion gas generated by a gas generating agent strikes against the protruding portion. By adjusting the length of the protruding portion of the pin 26, combustion gas can strike against the pin 26 such that combustion residues adheres to the pin 26. The pin 26 can be extended until the distal end portion 26a thereof abuts against the opposite wall surface 22a.

The gas generator 30 includes ignition means (an electrical type igniter) 34 and a gas generating agent 36 accommodated in a gas generator housing 32, and it is connected to one end of the pressurized medium chamber 20. The gas generator housing 32 and the pressurized medium chamber housing 22 are connected at a connecting portion 49 by resistance-welding. When the inflator 10 is assembled in an air bag system, the ignition means 34 is connected to an external power source via a connector and a lead wire.

The gas generating agent 36 can comprise, for example, 34 mass % of nitroguanidine as a fuel, 56 mass % of strontium nitrate as an oxidizing agent, and 10 mass % of sodium carboxymethylcellulose as a bonding agent (a discharged gas temperature: 700 to 1630° C.). A combustion residue generated when the gas generating agent 36 of the above composition is burnt is strontium oxide (melting point: 2430° C.). For this reason, the combustion residue is solidified to be massive (slag-like) without being melted.

A first communication hole 38 between the pressurized medium chamber 20 and the gas generator 30 is closed by a first rupturable plate 40 transformed into a bowl-like shape due to a pressure of the pressurized medium, and the interior of the gas generator 30 is maintained in the normal pressure.

The first rupturable plate 40 is resistance-welded to the gas generator housing 32 at a peripheral edge portion 40a.

A cap 44, having gas ejecting holes 42, is covered over the first rupturable plate 40 from the pressurized medium chamber 20 side. The cap 44 is attached to cover the first rupturable plate 40, so that combustion gas generated by combustion of the gas generating agent 36 is always ejected from the gas ejecting holes 42 via the cap 44.

The cap 44 has a flange portion 46 formed by folding an opening peripheral edge portion outwardly, and it is fixed by crimping a portion (a crimping portion) 48 of the gas generator housing 32 at the flange portion 46.

A diffuser portion 50, having gas discharging holes 52 for discharging the pressurized medium and the combustion gas, is connected to the other end side of the pressurized medium chamber 20, and the diffuser portion 50 and the pressurized medium chamber housing 22 is resistance-welded to each other at a connecting portion 54. A filter made of wire mesh can be disposed inside the diffuser portion 50 in order to arrest the combustion residue, if required.

A second communication hole 56 connecting the pressurized medium chamber 20 and the diffuser portion 50 is closed by a second rupturable plate 58 transformed into a bowl-like shape due to pressure of the pressurized medium, and the interior of the diffuser portion 50 is maintained under the normal pressure. The second rupturable plate 58 is resistance-welded to the diffuser portion 50 at a peripheral edge portion 58a.

Next, an operation in case where the inflator 10 shown in FIG. 1 is incorporated to an air bag system mounted on an automobile will be explained.

When an automobile receives the impact by a collision, the igniter 34 is actuated by the activation-signal outputting means to burn the gas generating agent 36, thereby generating a high temperature combustion gas. At this time, since the melting point of a combustion residue generated by combustion of the gas generating agent 36 is equal to or greater than a discharging temperature of a gas generated from the gas generating agent 36, the combustion residue hardly melts, maintained in solid form.

Thereafter, the first rupturable plate 40 is broken by a pressure increase inside the gas generator 30 due to the high temperature combustion gas, and combustion gas including a combustion residue flows into the cap 44 and ejected from the gas ejecting holes 42. At this time, since a temperature difference between the pressurized medium and the combustion gas in the pressurized medium chamber 20 is large, the combustion gas is cooled rapidly, so that the high temperature combustion residue is cooled and solidified and a combustion residue also adheres to an inner wall surface of an end surface 44a of the cap 44. Further, since the ejected combustion gas strikes against the inner wall 22a of the pressurized medium chamber housing 22, the combustion residue adheres to the inner wall surface and hardly discharged from the inflator 10. Incidentally, part of the remaining combustion residue adheres to the pin 26, too.

Thereafter, since the second rupturable plate 58 is broken by a pressure increase inside the pressurized medium chamber 20, the pressurized medium and the combustion gas are discharged from the gas discharging holes 52 via the second communication hole 56 to inflate an air bag.

Figure 2:
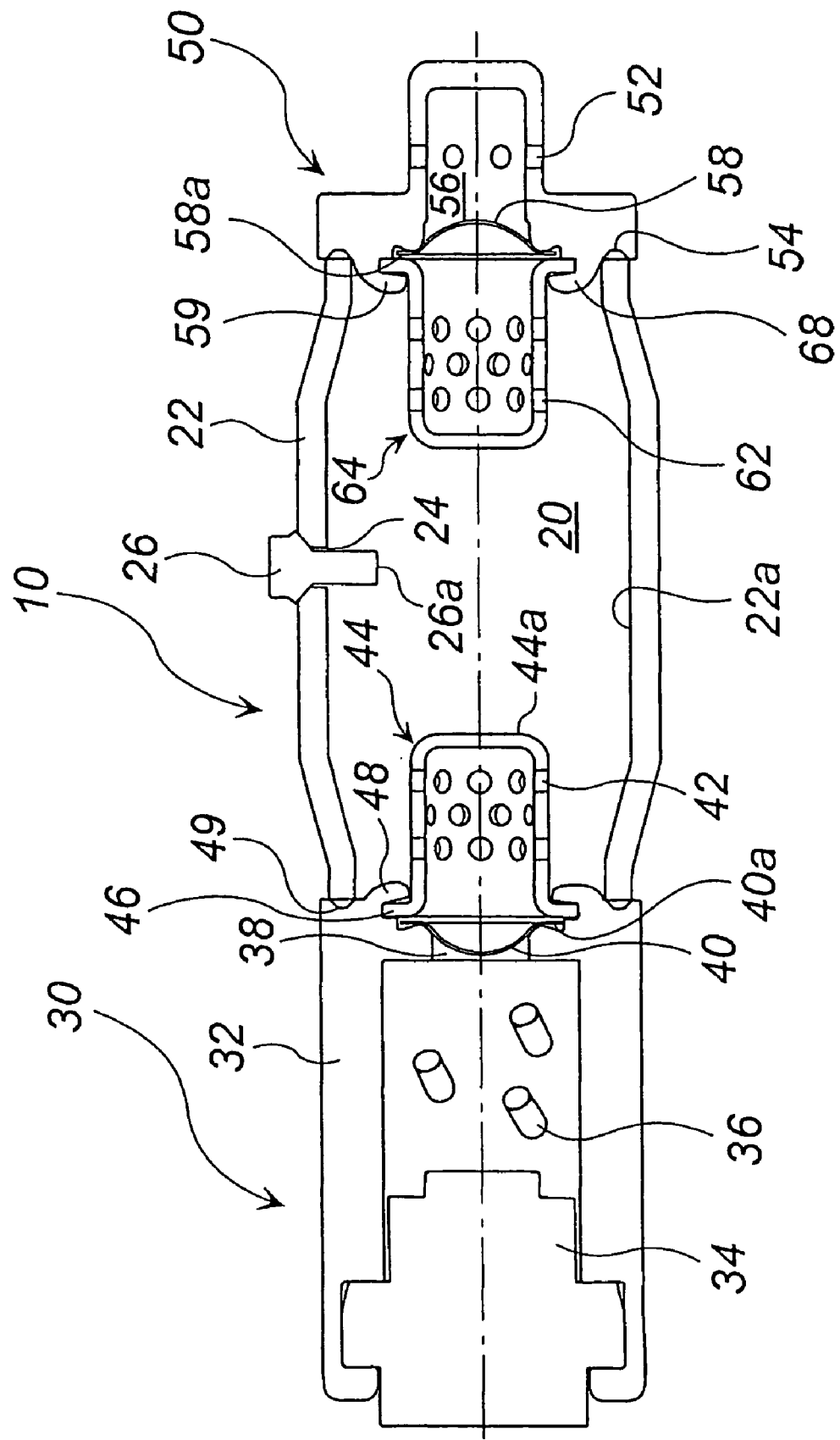
FIG. 2 is a sectional view of an inflator in the axial direction.

In such a course of the operation, since the inflator 10 exhibits the above-described actions and the advantageous effects (1) to (3) can be obtained, and the combustion residue discharged into the air bag is largely suppressed by these mutual effects. In an actual measurement, in case where the inflator is not provided with the cap 44, the combustion residue discharged outside the inflator 10 was 700 mg, but it can be reduced to 200 mg when the cap 44 is provided as shown in FIG. 1. Further, as shown in FIG. 2, by providing a cap 64 in the second rupturable plate 58 side, the arresting performance of the combustion residue can be further increased. Reference numeral 62 denotes a gas ejecting hole, reference numeral 68 denotes a flange portion, and the cap 64 can be fixed to the diffuser portion 50 by the flange portion 68 and a crimping portion 59.

Embodiment 2

Figure 3:
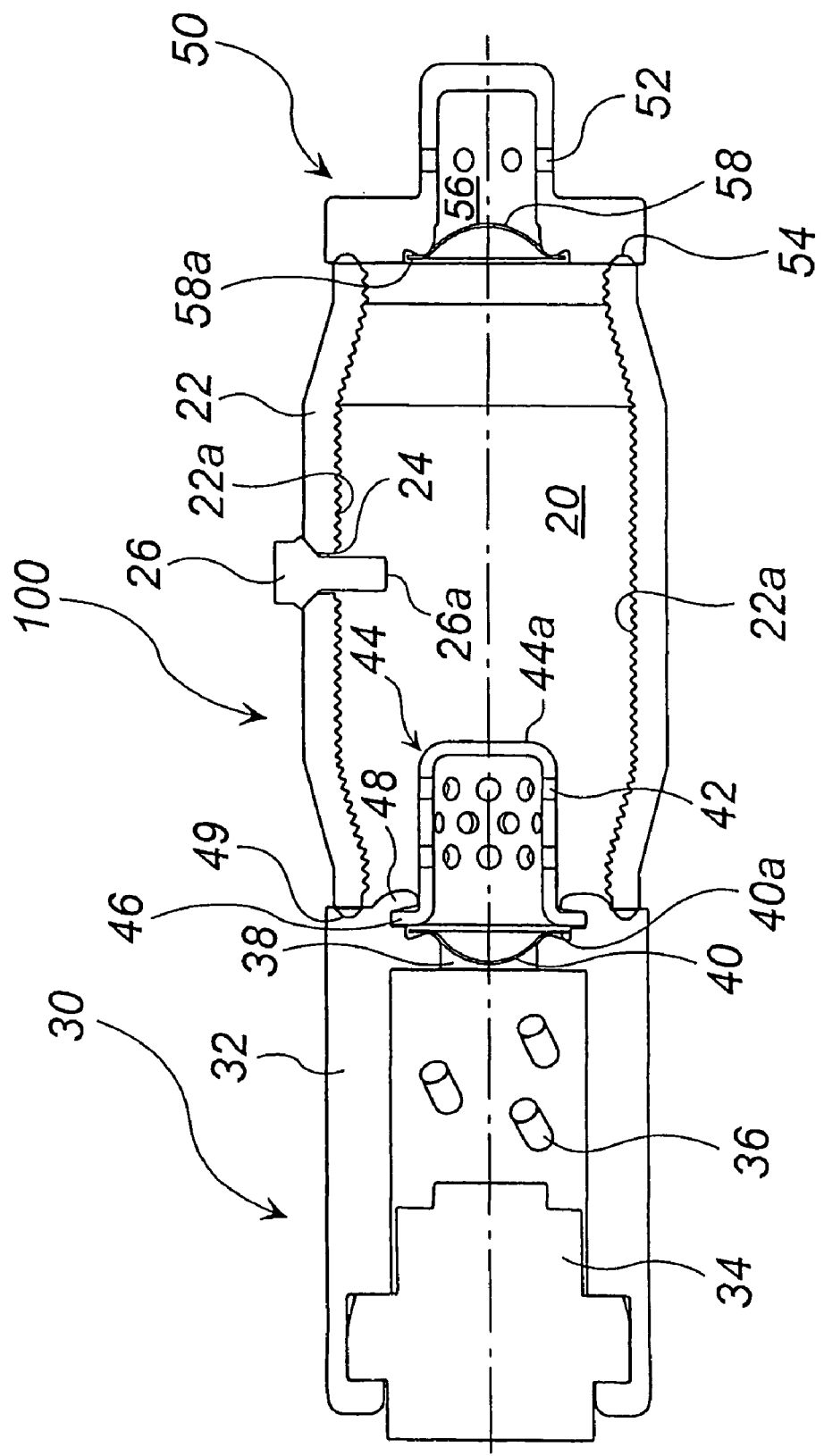
FIG. 3 is a sectional view of an inflator in the axial direction.

Another embodiment will be explained with reference to FIG. 3. FIG. 3 is a sectional view of an inflator in the axial direction thereof. An inflator 100 shown in FIG. 3 has almost the same structure as the inflator 10 shown in FIG. 1, and, in FIG. 3, the same reference numerals as those in FIG. 1 denote the same parts. A difference in structure from FIG. 1 and a difference in advantageous effect due to the difference in structure will be explained below.

In the inflator 100 shown in FIG. 3, an inner wall surface 22a of a pressurized medium chamber housing 22 has one or more grooves with a depth of 0.2 mm formed continuously or discontinuously in the circumferential direction. By providing such grooves, a combustion residue contained in combustion gas is caught and captured in the groove, and the advantageous effect (4) can be exhibited in addition to the advantageous effects (1) to (3). Further, as shown in FIG. 2, an aspect in which a cap 64 is provided can be employed.

Embodiment 3

Figure 4:
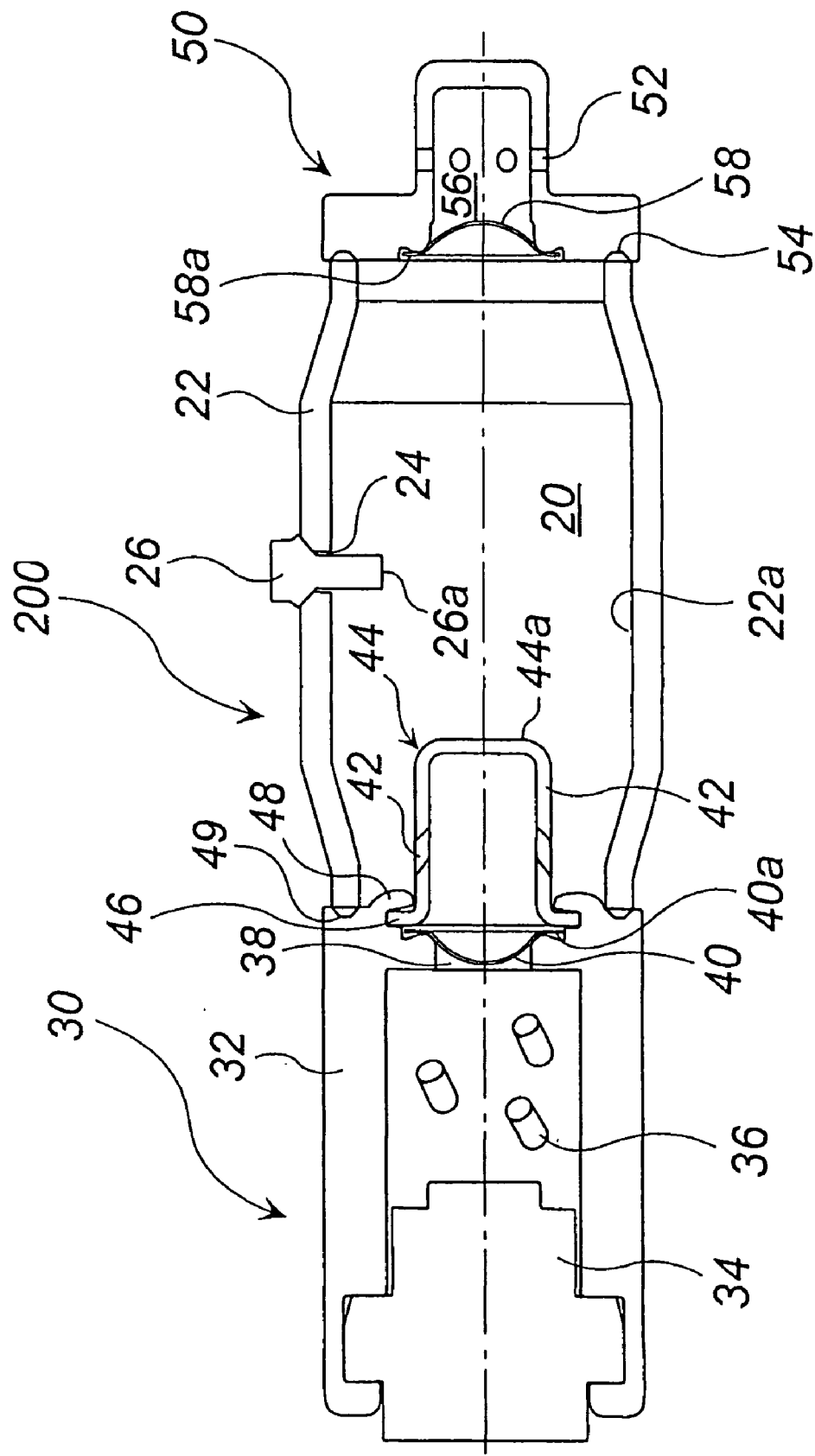
FIG. 4 is a perspective view and a plan view of a cap used in an inflator.

Another embodiment will be explained with reference to FIG. 4. FIG. 4 is a sectional view of an inflator in the axial direction thereof. An inflator 200 shown in FIG. 4 has almost the same structure as that of the inflator 10 shown in FIG. 1, and, in FIG. 4, the same reference numerals as those in FIG. 1 denote the same parts. A difference in structure from FIG. 1 and a difference in advantageous effect due to the difference in structure will be explained below.

In an inflator 200 shown in FIG. 4, gas ejecting holes 42 are provided on a side wall 42a of the cap 44 and they are opened to eject combustion gas towards the gas generator 30. By providing such gas ejecting holes 42, combustion gas ejected from the gas ejecting holes 42 strikes against a crimped portion 48 and its vicinities before it strikes against the inner wall surface 22a of the pressurized medium chamber housing 22, and thereby, the advantageous effect (5) can be exhibited in addition to the advantageous effects (1) to (3). Incidentally, when the inner wall surface 22a is incorporated in the inflator 200 shown in FIG. 4, the advantageous effect (4) can be further exhibited. Also, the cap 64, as shown in FIG. 2, may be provided, and the cap 44 of the other embodiment can be used instead of the cap 64.

Embodiment 4

Figure 5A:
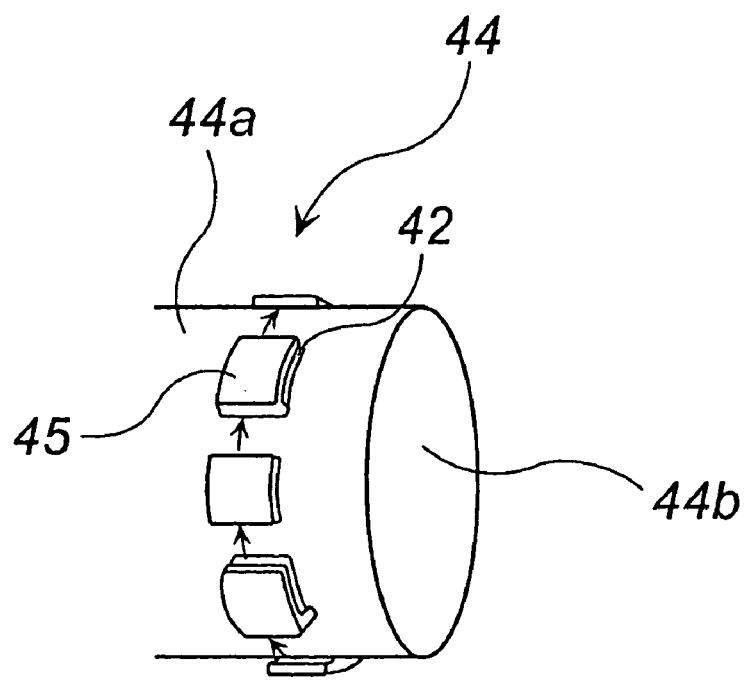
FIG. 5(a) and FIG. 5(b) are a perspective view and a plan view, respectively, of a cap used in an inflator.
Figure 5B:
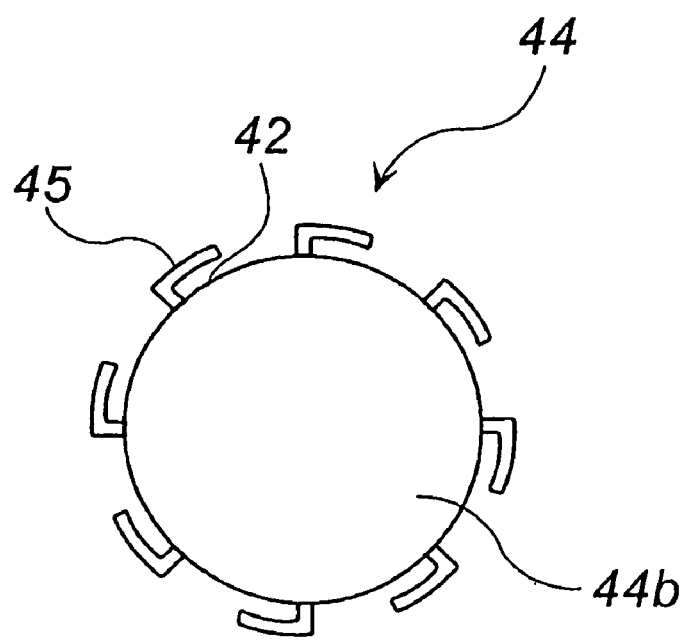
Figure 6A:
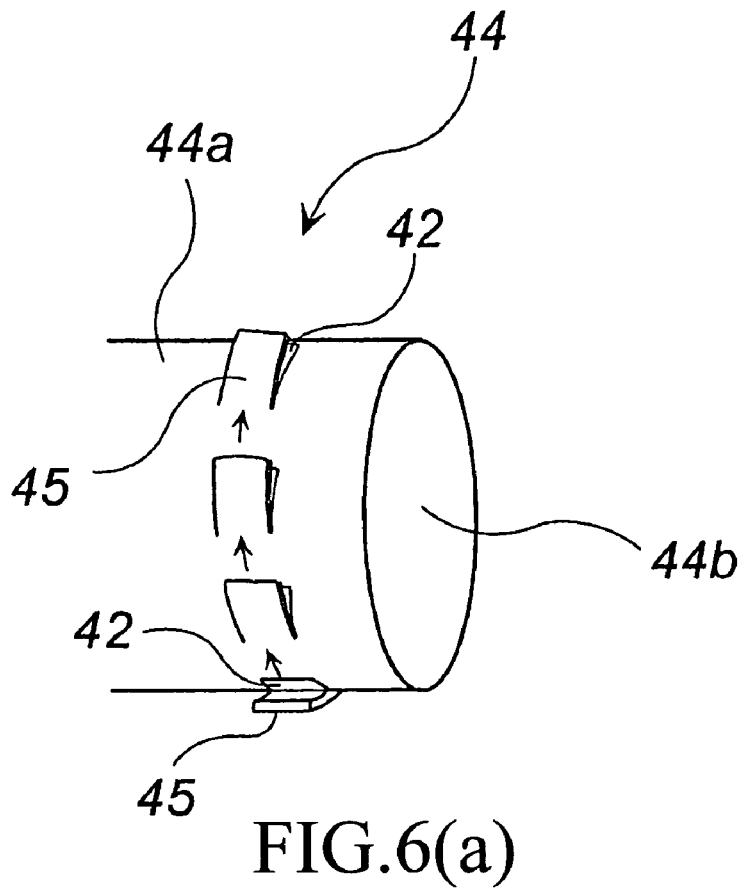
FIG. 6(a) and FIG. 6(b) are a perspective view and a plan view, respectively, of a cap used in an inflator.
Figure 6B:
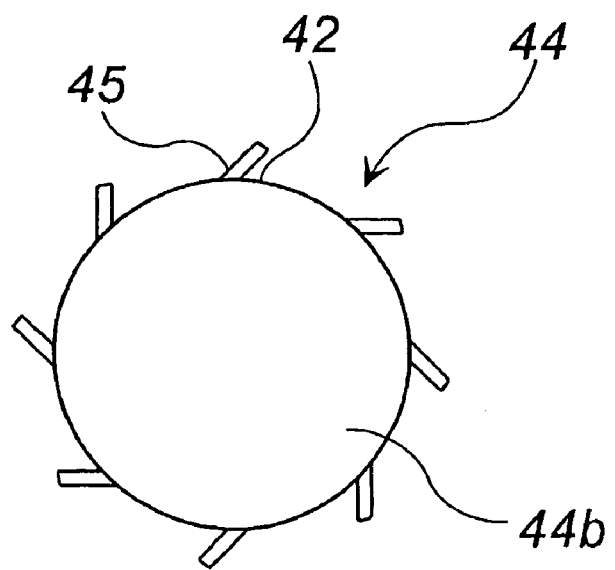
Figure 7:
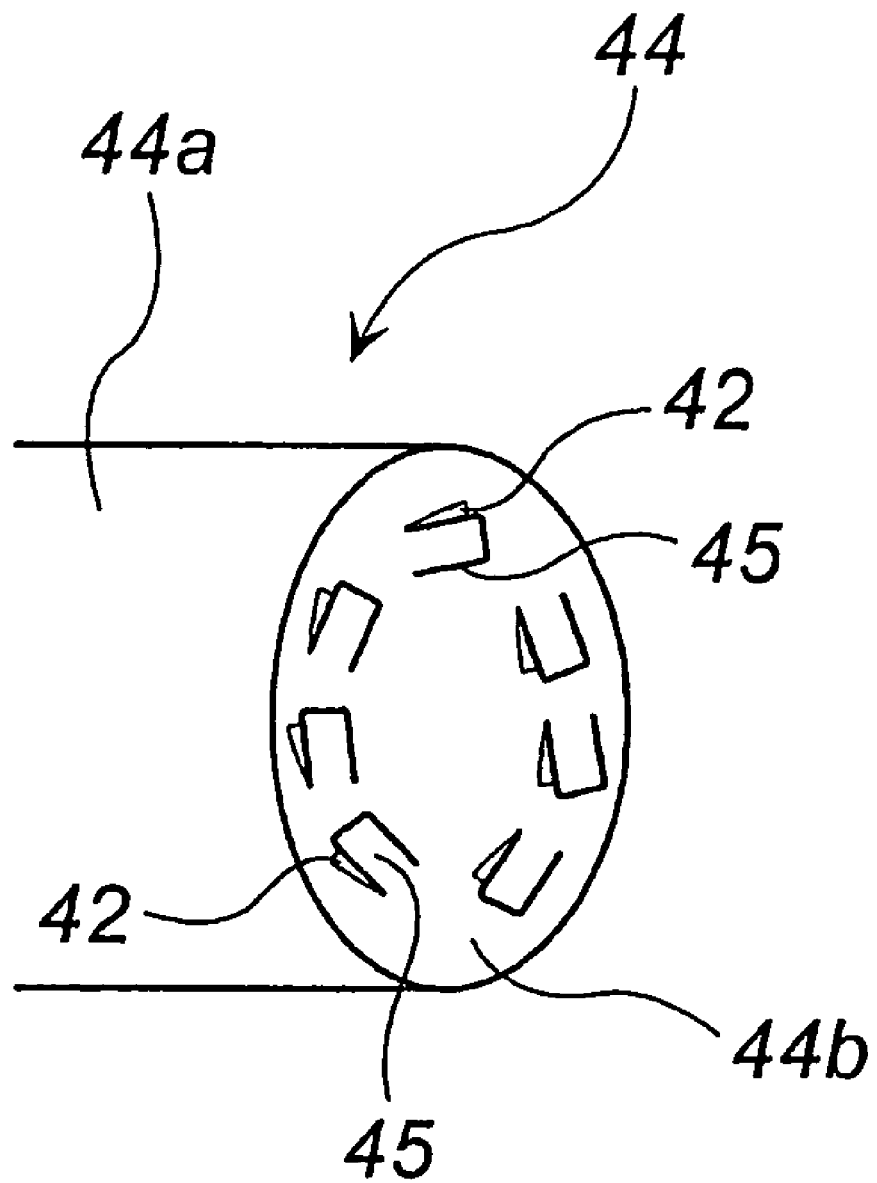
FIG. 7 is a sectional view of an inflator in the axial direction.

Another embodiment will be explained with reference to FIG. 5 to FIG. 7. FIGS. 5(a) and 5(b) are a perspective view and a plan view, respectively, of a cap of one embodiment, FIGS. 6(a) and 6(b) are a perspective view and a plan view, respectively, of a cap of another embodiment, and FIG. 7 is a perspective view of a cap of yet another embodiment. A cap 44 shown in FIG. 5 to FIG. 7 can be disposed in the inflators 10, 100, and 200 shown in FIG. 1, FIG. 3, and FIG.

4, respectively, and, in the inflator shown in FIG. 2, the cap 64 can also be in the shapes as shown in FIG. 5 to FIG. 7.

In the cap 44 shown in FIG. 5, gas ejecting holes 42 are provided in a side wall 44a of the cap 44, and a member (restricting member) 45 for circumferentially restricting an ejecting direction of combustion gas from the gas ejecting holes 42. The restricting member 45 is formed in a L-letter shape in plan view. Incidentally, the orientation of the restricting member 45 may be a different direction from that in FIG. 5.

Since such restricting members 45 are provided, combustion gas ejected from the gas ejecting hole 42 is ejected in the direction along the circumferential surface of the cap 44 to form an eddy, so that the advantageous effect (5) can be exhibited in addition to the advantageous effects (1) to (3). Incidentally, when the inner wall surface 22a of the pressurized medium chamber housing 22 takes the shape shown in FIG. 3, the advantageous effect (4) can be further exhibited.

The cap 44 shown in FIG. 6 is provided with flat plate-shaped restricting members 45 instead of the L-letter-shaped restricting members 45 shown in FIG. 5, and the same advantageous effect as those in FIG. 5 can be obtained.

The cap 44 shown in FIG. 7 is provided on its end wall 44b with gas ejecting holes 42, and members (restricting members) 45 for circumferentially restricting an ejected direction of combustion gas from the gas ejecting holes 42. The restricting member 45 can be formed in the same shape as shown in FIG. 5 or FIG. 6. An inflator using the cap 44 shown in FIG. 7 can obtain the same advantageous effects as those in FIG. 5 and FIG. 6.

Embodiment 5

Figure 8:
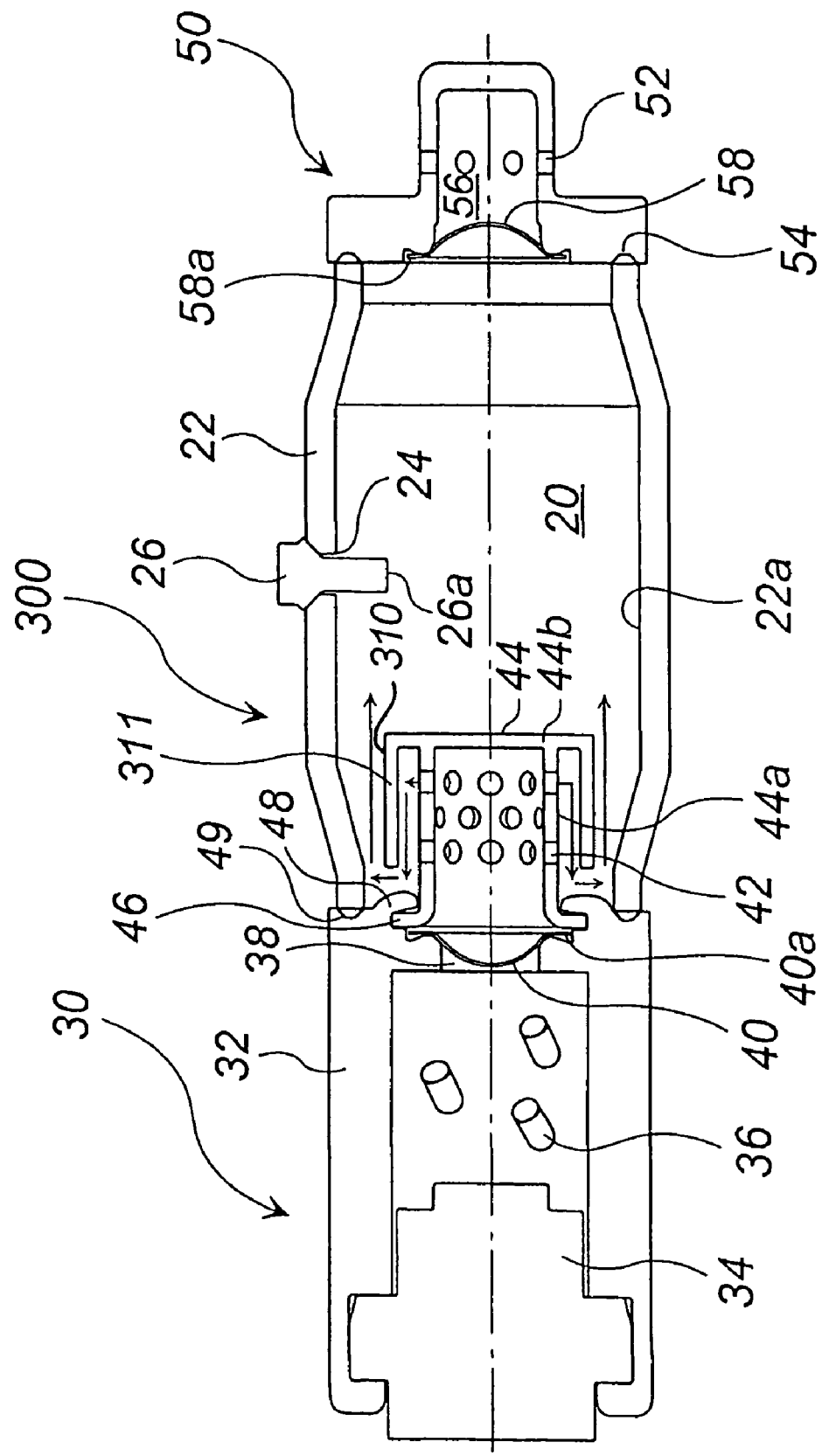
FIG. 8 is a sectional view of an inflator in the axial direction.

Another embodiment will be explained with reference to FIG. 8. FIG. 8 is a sectional view of an inflator in the axial direction. An inflator 300 shown in FIG. 8 has almost the same structure as that of the inflator 10 shown in FIG. 1, and, in FIG. 8, the same reference numerals as these in FIG. 1 denote the same parts. A difference in structure from FIG. 1 and a difference in advantageous effect due to the difference in structure will be explained below.

In the inflator 300 shown in FIG. 8, a cylindrical barrier member 310 is attached to the cap 44. The barrier member 310 has a closed one end integrated with an end wall 44b of the cap 44 and the other end opened, and it is formed such that a side wall 311 faces gas ejecting holes 42 provided on the side wall of the cap 44 with a distance. Also, as shown in FIG. 2, the inflator 300 can be provided with the cap 64, and further, the cap 44 of other embodiments can be employed instead of the cap 64.

With such a barrier member 310, the combustion gas ejected from the gas ejecting holes 42 strikes against an inner wall of a side wall 311 of the barrier member, and then, it moves from the opening. Thereby, the advantageous effect (6) can be exhibited in addition to the advantageous effects (1) to (3). Incidentally, when the inflator 300 is provided with an inner wall surface 22a as shown in FIG. 3, the advantageous effect (4) can be exhibited as well.

Embodiment 6

Figure 9:
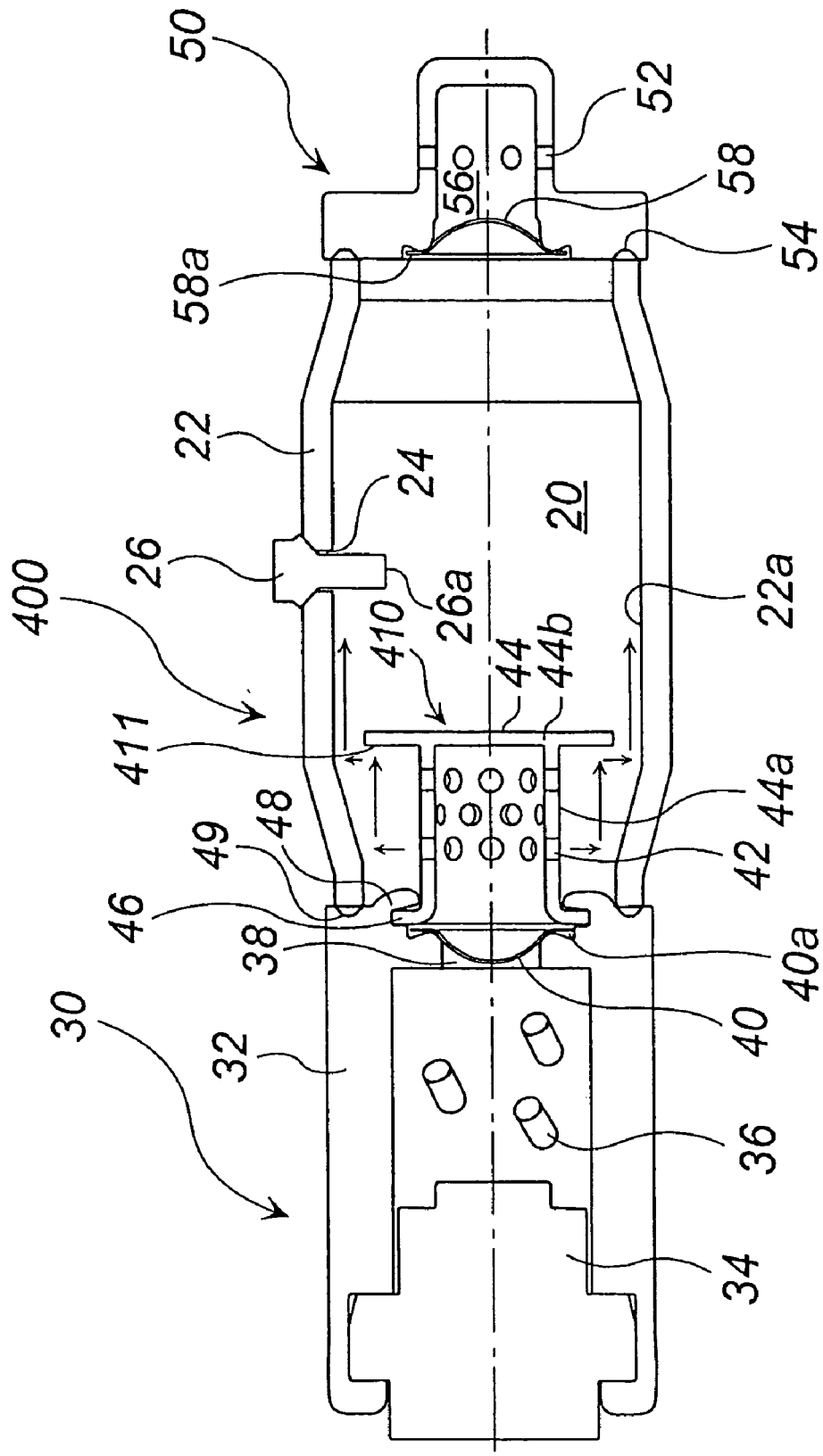
FIG. 9 is a sectional view of an inflator in the axial direction.

Another embodiment will be explained with reference to FIG. 9. FIG. 9 is a sectional view of an inflator in the axial direction. An inflator 400 shown in FIG. 9 has almost the same structure as that of the inflator 10 shown in FIG. 1, and, in FIG. 9, the same reference numerals as those in FIG. 1 denote the same parts. A difference in structure from FIG. 1 and a difference in advantageous effect due to the difference in structure will be explained below.

In the inflator 400 shown in FIG. 9, a disk-like barrier member 410 is attached. The barrier member 410 is integrated with an end wall 44b of the cap 44 and it is extended from the end wall of the cap 44 towards an inner wall surface 22a of the pressurized medium chamber housing 22. Also, as shown in FIG. 2, the inflator 400 can be provided with the cap 64, and further, the cap 44 of other embodiments can be used instead of the cap 64.

With such a barrier member 410, combustion gas ejected from the gas ejecting holes 42 strikes against the barrier member 410, and then, it moves from a clearance between the inner wall surface 22a of the pressurized medium chamber housing 20 and an peripheral edge portion 411 of the barrier member. Thereby, the advantageous effect (6) can be exhibited in addition to the advantageous effects (1) to (3). Incidentally, when the inflator 400 is provided with an inner wall surface 22a as shown in FIG. 3, the advantageous effect (4) can further be exhibited.

Embodiment 7

Figure 10:
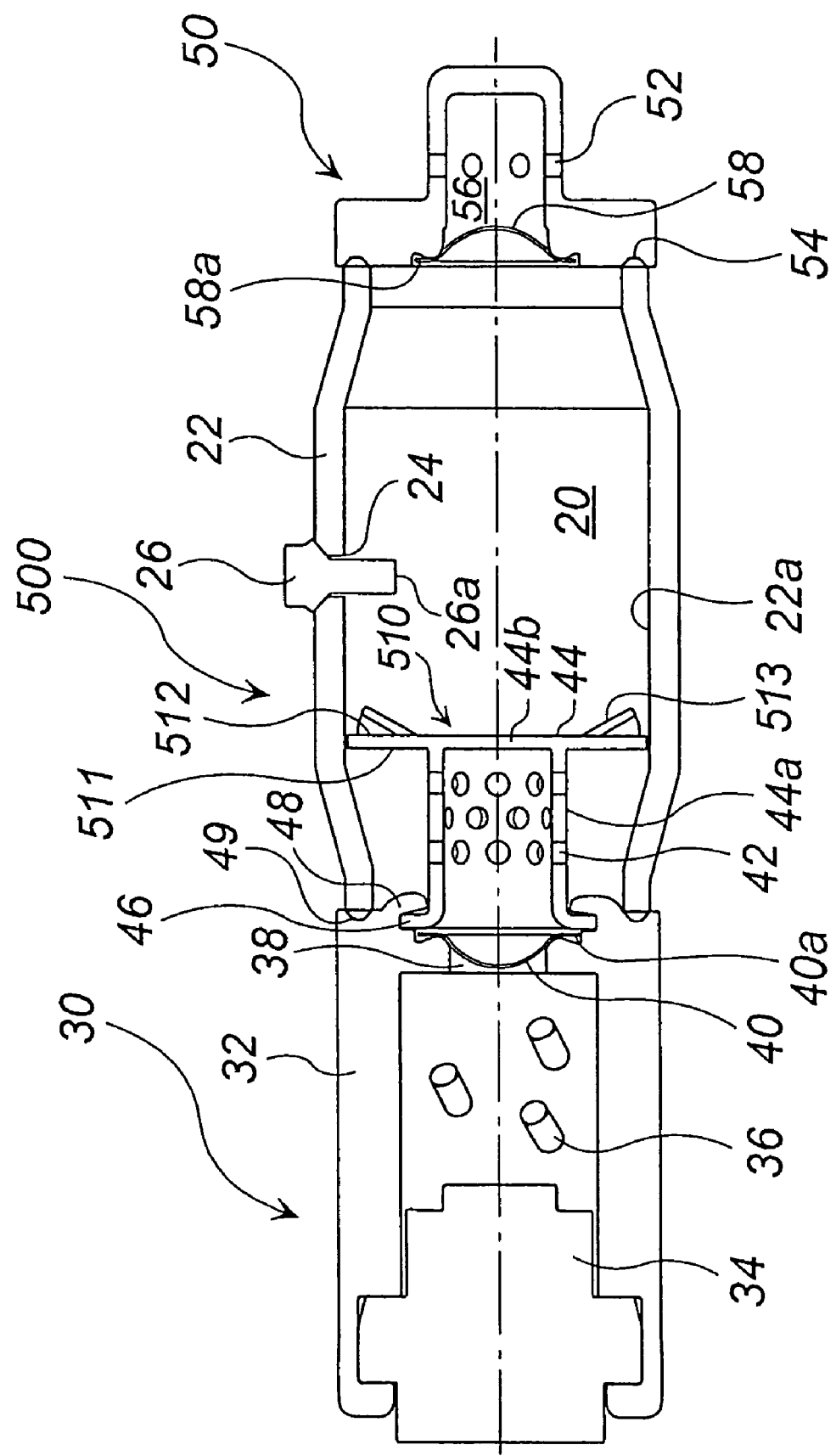
FIG. 10 is a sectional view of an inflator in the axial direction.

Another embodiment will be explained with reference to FIG. 10. FIG. 10 is a sectional view of an inflator in the axial direction. An inflator 500 shown in FIG. 10 has almost the same structure as that of the inflator 10 shown in FIG. 1, and, in FIG. 10, the same reference numerals as those in FIG. 1 denote the same parts. A difference in structure in FIG. 1 and a difference in advantageous effect due to the difference in structure will be explained below.

In the inflator 500 shown in FIG. 10, a disk-like barrier member 510 is attached. The barrier member 510 is integrated with an end wall 44b of the cap 44, and it is extended from the end wall 44b of the cap 44 towards the inner wall surface 22a of the pressurized medium chamber housing 20 so that a peripheral edge portion 511 abuts the inner wall surface 22a. Gas passing ports 512 and restricting means 513 having similar shapes like those in FIG. 6 are provided in the peripheral edge portion 511. Also, as shown in FIG. 2, the inflator 500 can be provided with the cap 64, and further, the cap 44 of another embodiment can be used instead of the cap 64.

With such a barrier member 510, combustion gas ejected from the gas ejecting holes 42 strikes against the barrier member 510, and then, it moves through the gas passing ports 512 and the restricting means 513. Thereby, the advantageous effects (6) and (5) can be exhibited in addition to the advantageous effects (1) to (3). Incidentally, when the inflator shown in FIG. 3 is employed with respect to the inner wall surface 22a of the pressurized medium chamber housing 22, the advantageous effect (4) can further be exhibited.

The inflator of the foregoing embodiments can be applied to various inflators such as an air bag inflator for a driver side, an air bag inflator for a passenger side next to a driver, an air bag inflator for a side collision, an inflator for a curtain air bag, an inflator for a knee-bolster, an inflator for an inflatable seat belt, an inflator for a tubular system, an inflator for a pretensioner, and the like.

Embodiment 8

Figure 11:
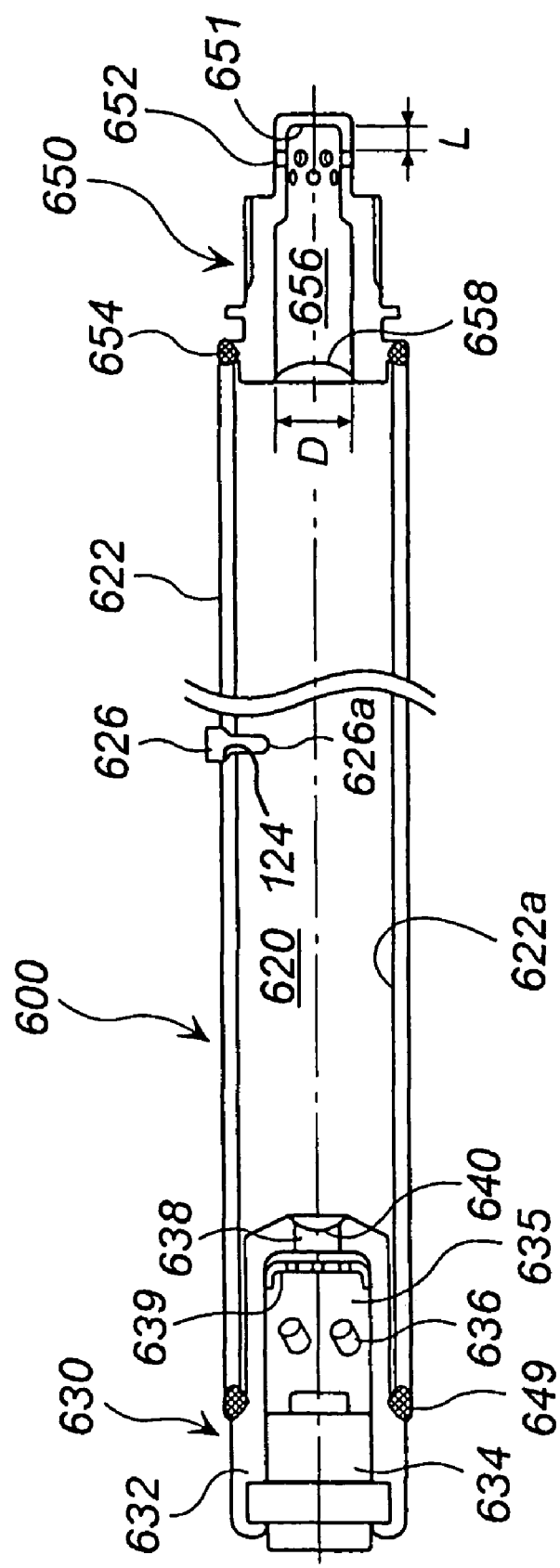
FIG. 11 is a sectional view of an inflator in the axial direction.

One embodiment will be explained with reference to FIG. 11. FIG. 11 is a sectional view of an inflator in the axial direction.

An inflator 600 comprises a pressurized gas chamber 620, a gas generator 630 and a diffuser portion 650.

The pressurized gas chamber 620 has an outer shell formed of a cylindrical pressurized gas chamber housing 622 and it is charged with pressurized gas comprising a mixture of argon and helium. Since the pressurized gas chamber housing 622 is made symmetrical in the axial direction and a radial direction thereof, it is unnecessary to adjust the orientation in the axial and radial directions at a time of assembly.

A charging hole 624 for charging pressurized gas is formed in a side wall of the pressurized gas chamber housing 622, and it is closed by a pin 626 after the pressurized gas is charged. A distal end portion 626a of the pin 626 protrudes into the pressurized gas chamber 620, and the protruding portion thereof has such a length that the flow of combustion gas generated by a gas generating agent strikes against the protruding portion. By adjusting the length of the protruding portion of the pin 626, combustion gas can strike against the pin 26 to have combustion residues adhered to the pin 626. In FIG. 11, the pin 626 can be extended until the distal end portion 626a thereof abuts against the opposite wall surface 622a.

The gas generator 630 has ignition means (e.g., an electrical type igniter) 634 accommodated in a gas generator housing 632 and a gas generating chamber 635 accommodating a gas generating agent 636, and it is connected to one end of the pressurized gas chamber 620. A retainer 639 is disposed inside the gas generating chamber 635.

The gas generator housing 632 and the pressurized gas chamber housing 622 are connected at a connecting portion 649 by resistance-welding. When the inflator 600 is assembled in an air bag system, the ignition means 634 is connected to an external power source via a connector and a lead wire.

The gas generating agent 636 can comprises, for example, 34 mass % of nitroguanidine as a fuel, 56 mass % of strontium nitrate as an oxidizing agent, and 10 mass % of sodium carboxymethylcellulose as a bonding agent (a discharged gas temperature: 700 to 1630° C.). A combustion residue generated when the gas generating agent 636 of the above composition is burnt is strontium oxide (melting point: 2430° C.). For this reason, the combustion residue is solidified to be massive (slag-like) without being melted.

A first communication hole 638 between the pressurized gas chamber 620 and the gas generator 630 is closed by a first rupturable plate 640, and the interior of the gas generator 630 is maintained under the normal pressure. The first rupturable plate 640 is resistance-welded to the gas generator housing 632 at a peripheral edge portion.

A diffuser portion 650 having gas discharging ports 652 for discharging the pressurized gas and the combustion gas is connected to the other end side of the pressurized gas chamber 620, and the diffuser portion 650 and the pressurized gas chamber housing 622 are resistance-welded to each other at a connecting portion 654. The diffuser portion 650 and the gas generating chamber housing 622 are connected such that their central axes coincide with each other.

The diffuser portion 650 is a cap-shaped and has a plurality of gas discharging ports 652 through which a gas passes, wherein a distance L between a closed end surface 651 and an gas discharging port nearest to the closed end surface 651 and a diameter D of the rupturable plate 658 (except for a welded peripheral edge portion) satisfy the following formula: $L \geq D/2$.

The distance L is preferably 3 to 8 mm, more preferably 4 to 8 mm, and particularly preferably 5 to 8 mm. The diameter of a plurality of the gas discharging ports 652 is preferably 0.5 to 2 mm, and more preferably 0.5 to 1.2 mm. The total opening area of a plurality of the gas discharging ports 652 is preferably 20 to 1000 mm$^2$, and more preferably 100 to 500 mm$^2$.

A second communication hole 656 between the pressurized gas chamber 620 and the diffuser portion 650 is closed by a second rupturable plate 658, and the interior of the diffuser portion 650 is maintained under the normal pressure. The second rupturable plate 658 is resistance-welded to the diffuser portion 650 at its peripheral edge portion.

Next, an operation in case of the inflator 600 shown in FIG. 11 when incorporated to an air bag system mounted to an automobile will be explained.

When an automobile receives an impact due to a collision, the igniter 634 is actuated by the activation-signal outputting means to burn the gas generating agent 636, thereby generating a high temperature combustion gas. At this time, since the melting point of a combustion residue generated by combustion of the gas generating agent 636 is equal to or greater than a discharging temperature of a gas generated from the gas generating agent 636, the combustion residue hardly melts, and stays solid.

Thereafter, the first rupturable plate 640 is broken by a pressure increase inside the gas generator 630 due to the high temperature combustion gas, and combustion gas including a combustion residue flows into the pressurized gas chamber 620.

At this time, since a temperature difference between the pressurized gas and the combustion gas in the pressurized gas chamber 620 is large, the combustion gas is cooled rapidly, so that the high temperature combustion residue is cooled and solidified. Since the combustion gas also strikes against an inner wall 622a of the pressurized gas chamber housing 622, the combustion residue adheres to an inner wall surface thereof and hardly discharged from the inflator 600. Incidentally, part of the remaining combustion residue adheres to the pin 626, too.

Thereafter, since the second rupturable plate 658 is broken by a pressure increase inside the pressurized gas chamber 620, the pressurized gas and the combustion gas are discharged from the gas discharging holes 652 via the second communication hole 656 to inflate an air bag.

At this time, since the combustion gas and the pressurized gas flow out from the gas discharging ports 652 after striking against the closed end surface 651 of the diffuser portion 650 to change their flow directions, foreign materials are trapped in a pocket portion between the closed end surface 651 and the gas discharging hole 652 nearest therefrom. Since the above action is elevated by setting a depth (L) of the pocket portion to the maximum length (D/2) of the foreign material or more, the foreign material can be trapped more easily. Because the gas is discharged via the diffuser portion 650 in this manner, the foreign materials are removed.

In such a course of the operation, since the inflator 600 exhibits the above-described advantageous effects (IIa) to (IIc), (1) to (3), an amount of pieces of the broken rupturable plate or combustion residues discharged into the air bag is largely suppressed by these mutual effects.

Embodiment 9

Figure 12:
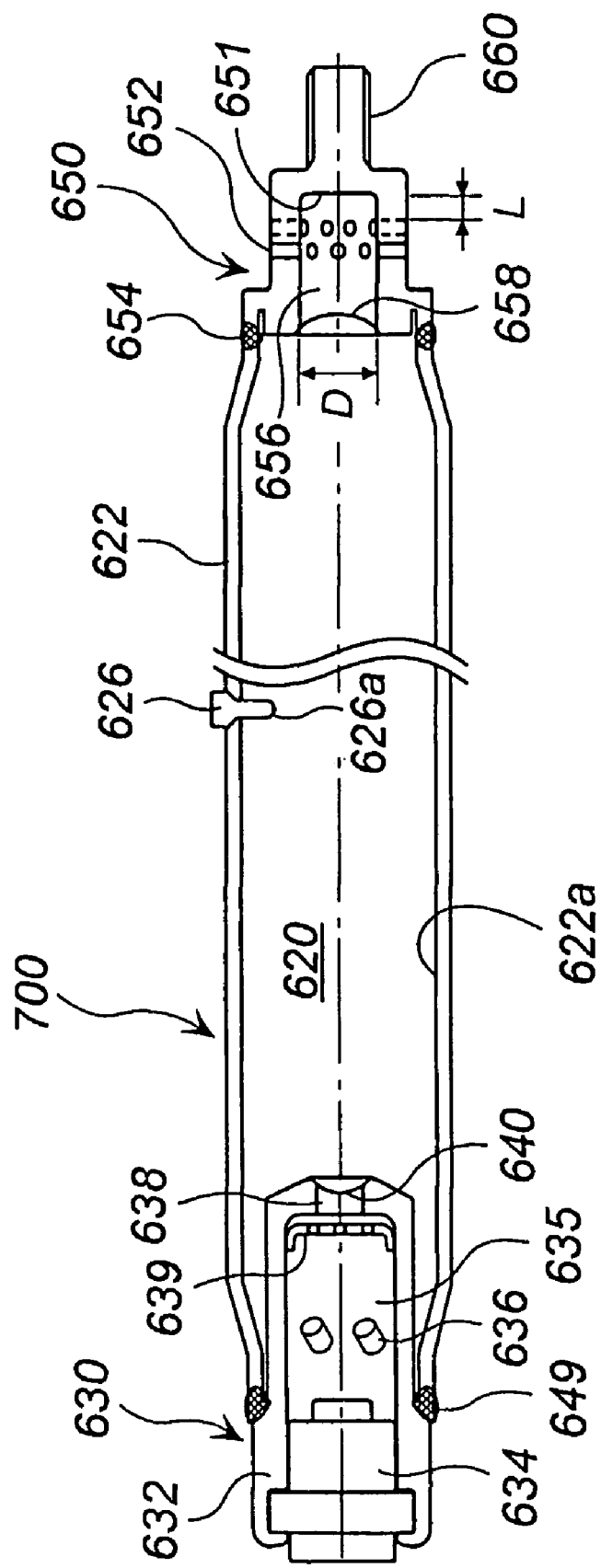
FIG. 12 is a sectional view of an inflator in the axial direction.

One embodiment will be explained with reference to FIG. 12. FIG. 12 is a sectional view of an inflator in the axial direction. Since the inflators shown in FIG. 12 and FIG. 11 are different from each other only in part of a structure of a diffuser portion, the same parts are attached with the same reference numerals and explanations thereof will be omitted.

An inflator 700 shown in FIG. 12 is provided at a distal end portion of a diffuser portion 650 with a stud bolt 660 used at the time of mounting the inflator to a module case.

The inflator 700 shown in FIG. 12 discharges gas in the same way as the inflator 600 shown in FIG. 11 and has the same operation.

Embodiment 10

Figure 13:
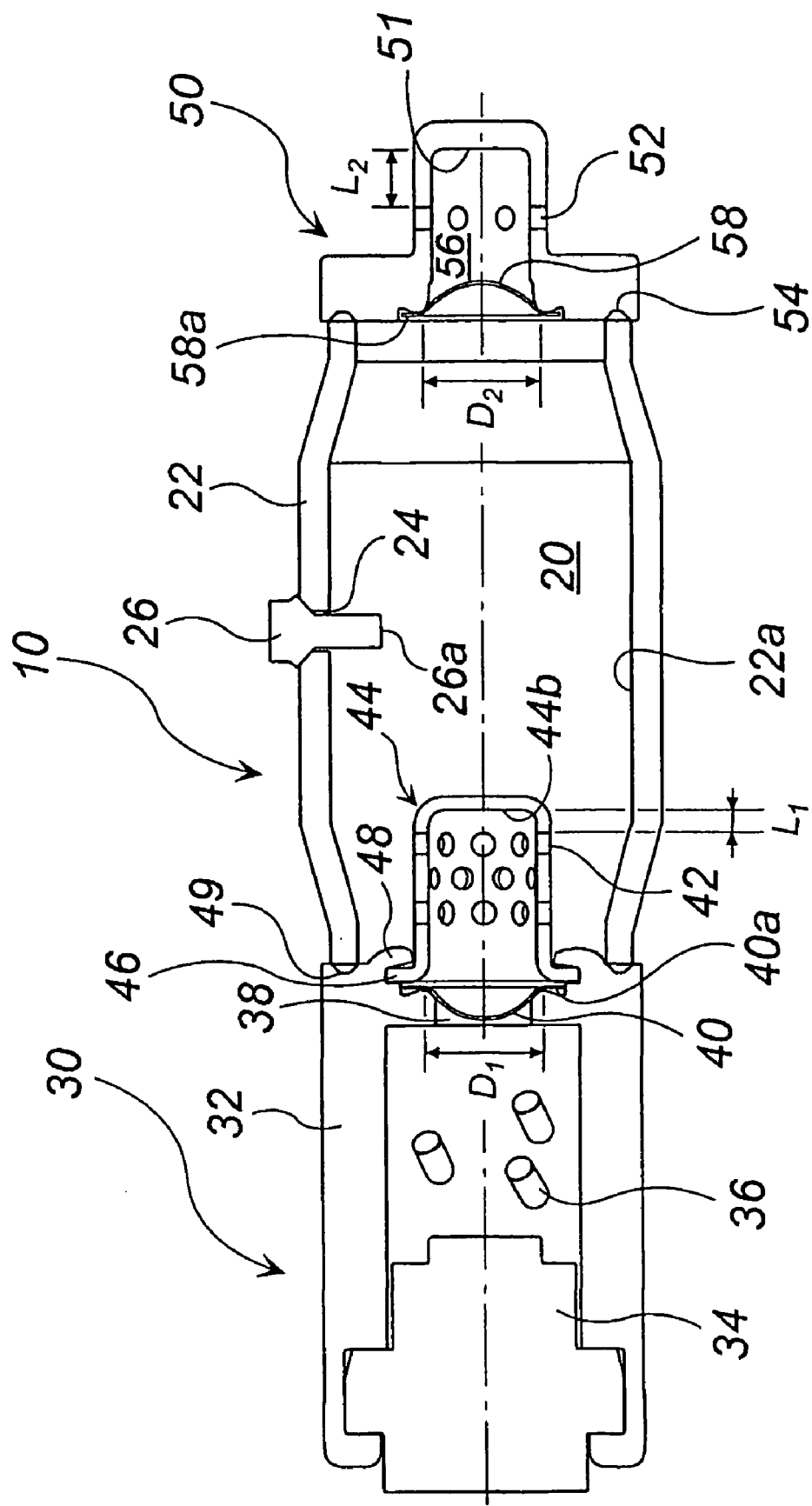
FIG. 13 is a sectional view of an inflator in the axial direction.

One embodiment will be explained with reference to FIG. 13. FIG. 13 is a sectional view of an inflator in the axial direction thereof.

An inflator 10 comprises a pressurized gas chamber 20, a gas generator 30, and a diffuser portion 50.

The pressurized gas chamber 20 is defined by an outer shell formed of a cylindrical pressurized gas chamber housing 22 and it is charged with pressurized gas comprising a mixture of argon and helium. Since the pressurized gas chamber housing 22 is symmetrical in the axial direction and in a radial direction thereof, it is unnecessary to adjust the orientation in the axial and radial directions at a time of assembling.

A charging hole 24 for charging pressurized gas is formed on a side wall of the pressurized gas chamber housing 22, and it is closed by a pin 26 after the pressurized gas is charged. A distal end portion 26a of the pin 26 protrudes into the pressurized gas chamber 20, and the protruding portion thereof has such a length that the flow of combustion gas generated by a gas generating agent strikes against the protruding portion. By adjusting the length of the protruding portion of the pin 26, combustion gas strikes against the pin 26, such that the combustion residues adhere to the pin 26. In FIG. 13, the pin 26 can be extended until the distal end portion 26a thereof abuts the opposite wall surface 22a.

The gas generator 30 includes ignition means (e.g., an electrical type igniter) 34 and a gas generating agent 36 accommodated in a gas generator housing 32, and it is connected to one end of the pressurized gas chamber 20. The gas generator housing 32 and the pressurized gas chamber housing 22 are connected at a connecting portion 49 by resistance-welding. When the inflator 10 is assembled in an air bag system, the ignition means 34 is connected to an external power source via a connector and a lead wire.

The gas generating agent 36 can comprises, for example, 34 mass % of nitroguanidine as a fuel, 56 mass % of strontium nitrate as an oxidizing agent, and 10 mass % of sodium carboxymethylcellulose as a bonding agent (a discharged gas temperature: 700 to 1630° C.). A combustion residue generated when the gas generating agent 36 of the above composition is burnt is strontium oxide (melting point: 2430° C.). For this reason, the combustion residue is solidified to be massive (slag-like) without being melted.

A first communication hole 38 between the pressurized gas chamber 20 and the gas generator 30 is closed by a first rupturable plate 40 in a bowl-like shape, and the interior of the gas generator 30 is maintained under the normal pressure. The first rupturable plate 40 is resistance-welded to the gas generator housing 32 at a peripheral edge portion 40a.

A cap 44 having gas ejecting holes 42 covers the first rupturable plate 40 from the pressurized gas chamber 20 side. The cap 44 is attached to cover the first rupturable plate 40, so that combustion gas generated by combustion of the gas generating agent 36 is always ejected from the gas ejecting holes 42 of the cap 44.

A distance L1 between a closed end surface 44b of the cap 44 and a gas ejecting hole 42 nearest to the closed end surface 44b, and a diameter D1 of the rupturable plate 40 (except for a welded peripheral edge portion) satisfy the following formula: $L1 \geq D1/2$.

The distance L1 is preferably 3 to 8 mm, more preferably 4 to 8 mm, and yet more preferably 5 to 8 mm. The diameter of a plurality of the gas ejecting holes 42 is preferably 0.5 to 2 mm, and more preferably 0.5 to 1.2 mm. The total opening area of a plurality of the gas ejecting holes 42 is preferably 20 to 1000 $mm^2$, and more preferably 100 to 500 $mm^2$.

The cap 44 has a flange portion 46 formed by folding an opening peripheral edge portion outwardly, and it is fixed by crimping a portion (i.e., a crimping portion) 48 of the gas generator housing 32 at the flange portion 46.

A diffuser portion 50 having gas discharging holes 52 for discharging the pressurized gas and the combustion gas is connected to the other end side of the pressurized gas chamber 20, and the diffuser portion 50 and the pressurized gas chamber housing 22 is resistance-welded to each other at a connecting portion 54.

The diffuser portion 50 is a cap-shaped one having a plurality of gas discharging ports 52 through which a gas passes, wherein a distance L2 between a closed end surface 51 and a gas discharging port nearest to the closed end surface 51, and a diameter D2 of the rupturable plate 58 (except for a welded peripheral edge portion) satisfy the following formula: $L2 \geq D2/2$.

The distance L2 is preferably 3 to 8 mm, more preferably 4 to 8 mm, and yet more preferably 5 to 8 mm. The diameter of a plurality of the gas discharging ports 52 is preferably 0.5 to 2 mm, and more preferably 0.5 to 1.2 mm. The total opening area of a plurality of the gas discharging ports 52 is preferably 20 to 1000 $mm^2$, and more preferably 100 to 500 $mm^2$.

A second communication hole 56 between the pressurized gas chamber 20 and the diffuser portion 50 is closed by a second rupturable plate 58, and the interior of the diffuser portion 50 is maintained under the normal pressure. The second rupturable plate 58 is resistance-welded to the diffuser portion 50 at a peripheral edge portion 58a.

Next, an operation when the inflator 10 shown in FIG. 13 is incorporated to an air bag system mounted on an automobile will be explained.

When an automobile receives an impact by a collision, the igniter 34 is actuated and ignited by the activation-signal outputting means to burn the gas generating agent 36, thereby generating a high temperature combustion gas. At this time, since the melting point of a combustion residue generated by combustion of the gas generating agent 36 is equal to or greater than a discharging temperature of a gas generated from the gas generating agent 36, the combustion residue hardly melts, and remains solid.

Thereafter, the first rupturable plate 40 is broken by a pressure increase inside the gas generator 30 due to the high temperature combustion gas, and combustion gas including a combustion residue flows into the cap 44 to be ejected from the gas ejecting holes 42.

At this time, the pressurized gas flows out from the gas ejecting holes 42 after the pressurized gas strikes against the closed end surface 44b of the cap 44 to change its flow direction, so that foreign materials can be easily trapped at a pocket portion between the closed end surface 44b and the gas ejecting hole 42 nearest to the closed end surface 44b. Since the above-described action is enhanced by setting the depth (L1) of the pocket portion to the maximum length (D1/2) of the foreign material or more, the foreign materials are trapped more easily in the pocket. As described above, the gas is discharged from the cap 44 to remove the foreign materials.

Further, since a temperature difference between the pressurized gas and the combustion gas in the pressurized gas chamber 20 is large, the combustion gas is cooled rapidly, so that the high temperature combustion residue is cooled and solidified and a combustion residue also adheres to the closed end surface 44b of the cap 44. Further, the ejected combustion gas strikes against an inner wall 22a of the pressurized gas chamber housing 22, so that the combustion residue adheres to an inner wall surface and if not discharged from the inflator 10. Incidentally, part of the remaining combustion residue adheres to the pin 26, as well.

Thereafter, the second rupturable plate 58 is broken by a pressure increase inside the pressurized gas chamber 20, and consequently, the pressurized gas and the combustion gas are discharged from the gas discharging holes 52 via the second communication hole 56 to inflate an air bag. At this time, since the relationship of $L2 \geq D2/2$ is satisfied even in the diffuser portion 50, an action similar to that of the cap 44 can be conducted.

In such a course of action, the inflator 10 exhibits the above-described advantageous effects (IIa) to (IIc), (1) to (3), an amount of pieces of the rupturable plate or combustion residues discharged in the air bag is largely suppressed. In an actual measurement, when the cap 44 was not provided in the structure shown in FIG. 13 and the relationship of $L2 \geq D2/2$ was not satisfied in the diffuser portion 50, combustion residues discharged outside the inflator 10 was 700 mg. However, it was reduced to 200 mg by employing the structure shown in FIG. 13.

Embodiment 11

Figure 14:
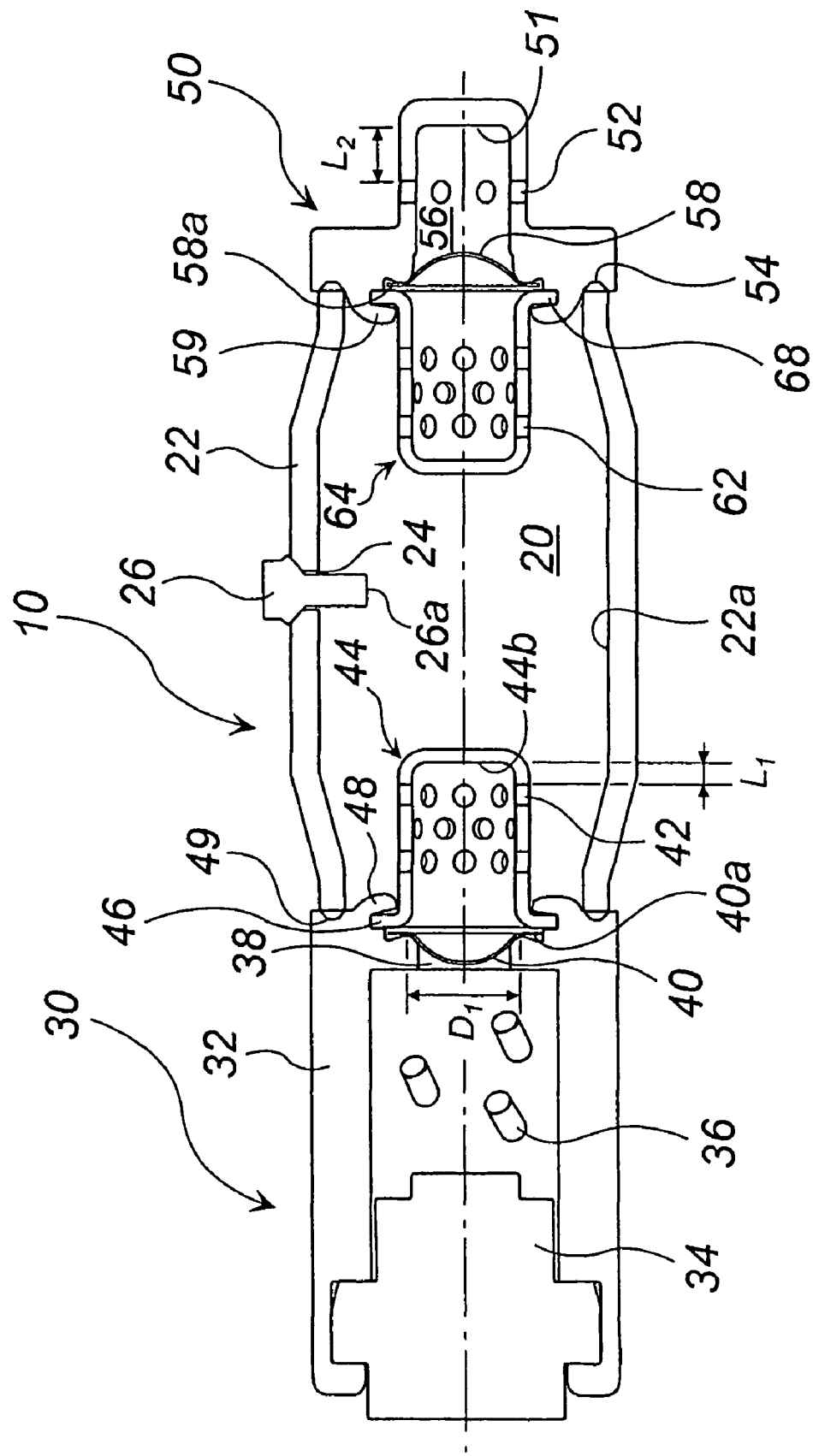
FIG. 14 is a sectional view of an inflator in the axial direction.

One embodiment will be explained with reference to FIG. 14. FIG. 14 is a sectional view of an inflator in the axial direction. Since the inflators shown in FIG. 14 and FIG. 13 have the same structure except that the inflator shown in FIG. 14 is further provided with a cap covering the second rupturable plate, so that the same elements are attached with the same reference numerals and explanations thereof will be omitted.

A cap 64 having gas outflow holes 62 covers a second rupturable plate 58 from the pressurized gas chamber 20 side. The cap 64 is attached to cover the second rupturable plate 58 so that combustion gas generated by combustion of a gas generating agent 36 always passes through the cap 64 and flows into a diffuser portion 50 from the gas outflow holes 62. Reference numeral 68 denotes a flange portion, and the cap 64 is fixed to the diffuser portion 50 by the flange portion 68 and crimping portion 59. The diameter of and the total opening area of a plurality of the gas outflow holes 62 can be made equal to those in the gas ejecting holes 42.

In the inflator 10 shown in FIG. 14, the cap 44 and the diffuser portion 50 satisfy the relation of $L1 \geq D/2$ and the relation of $L2 \geq D2/2$ like the inflator 10 shown in FIG. 13 and the cap 64 is further provided, so that the advantageous effects (IIa) to (IIc) are further enhanced.

Embodiment 12

Figure 15:
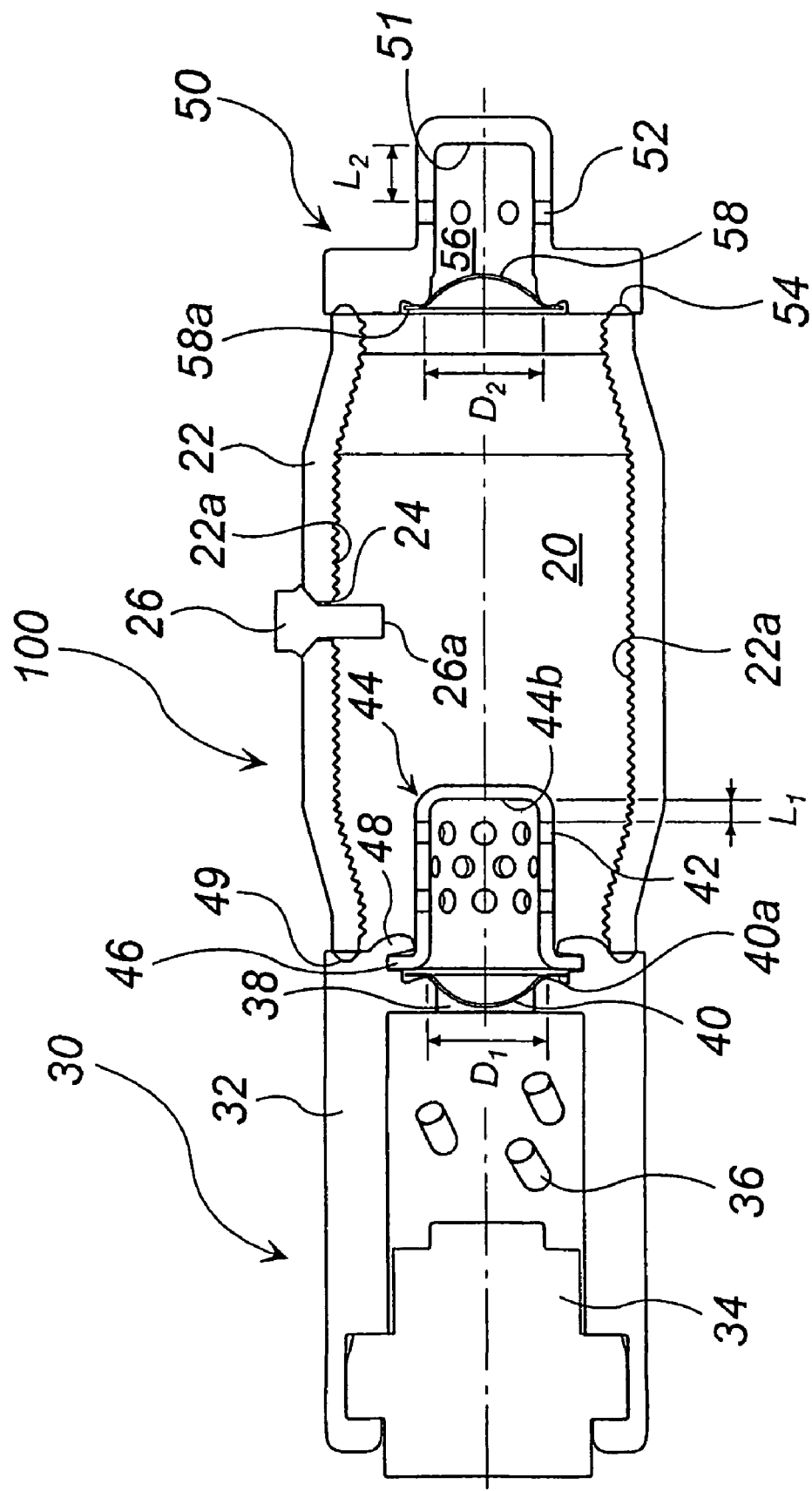
FIG. 15 is a sectional view of an inflator in the axial direction.

Another embodiment will be explained with reference to FIG. 15. FIG. 15 is a sectional view of an inflator in the axial direction. An inflator 100 shown in FIG. 15 has almost the same structure as that of the inflator 10 shown in FIG. 13, the same reference numerals as those in FIG. 13 denote the same parts in FIG. 15. A difference in structure from FIG. 13 and an advantageous effect due to the difference in structure will be explained below.

In the inflator 100 shown in FIG. 15, an inner wall surface 22a of a pressurized gas chamber housing 22 has one or more grooves with a depth of 0.2 mm formed continuously or discontinuously in the circumferential direction. For this reason, combustion residues contained in combustion gas is arrested in the groove, and thereby, an advantageous effect (4) can be exhibited in addition to the advantageous effects (1) to (3). Further, as shown in FIG. 14, a cap 64 can also be employed.

Further, the cap 44 and the diffuser portion 50 satisfy the relation of $L1 \geq D1/2$ and the relation of $L2 \geq D2/2$ like the inflator 10 shown in FIG. 13, the advantageous effects (IIa) to (IIc) can be obtained.

Embodiment 13

Figure 16:
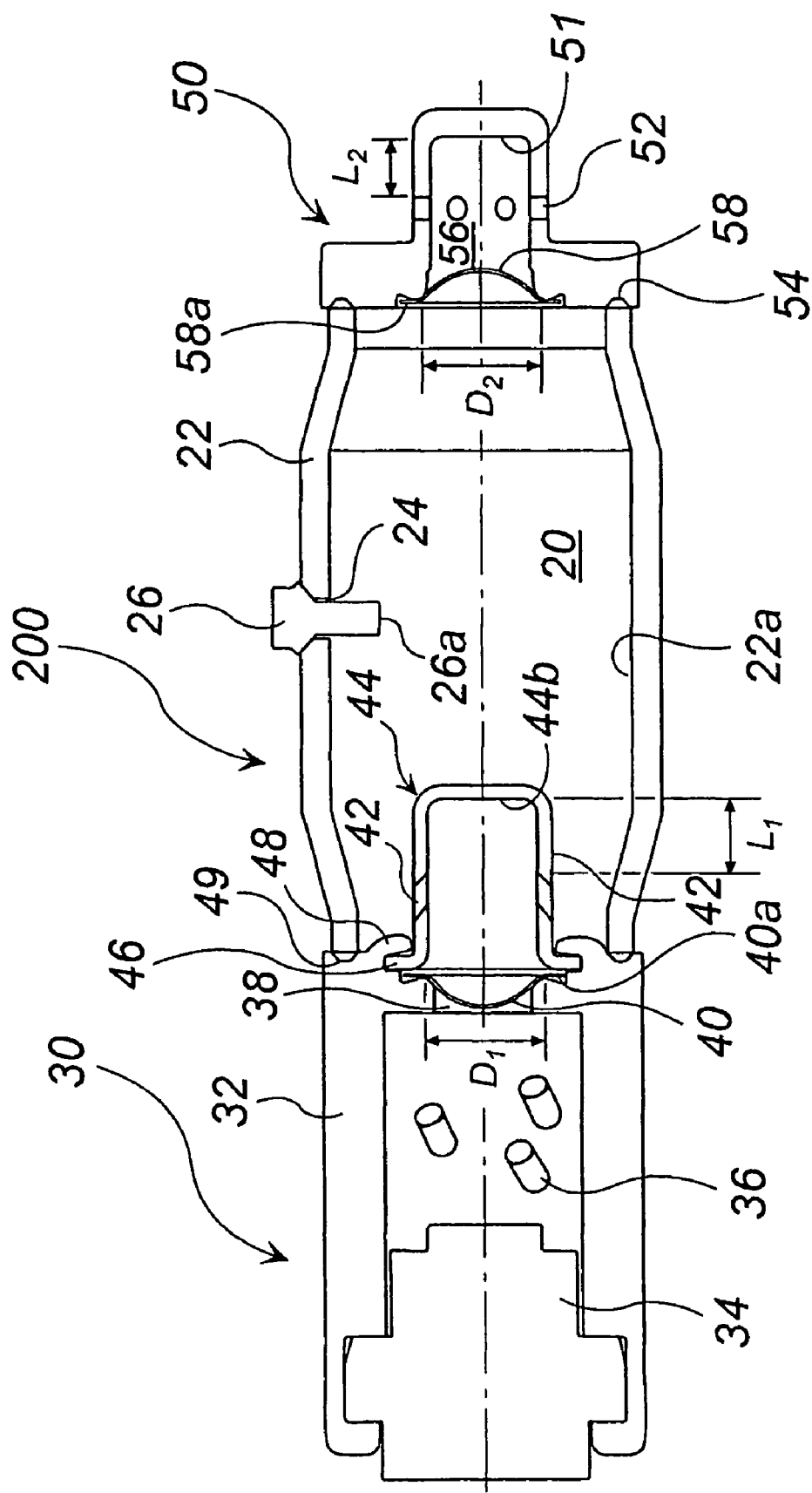
FIG. 16 is a sectional view of an inflator in the axial direction.

Another embodiment will be explained with reference to FIG. 16. FIG. 16 is a sectional view of an inflator in the axial direction. An inflator 200 shown in FIG. 16 has almost the same structure as that of the inflator 10 shown in FIG. 13, and, in FIG. 16, the same reference numerals as those in FIG. 13 denote the same parts. A difference in structure from FIG. 13 and an advantageous effect due to the difference in structure will be explained below.

In the inflator 200 shown in FIG. 16, gas ejecting holes 42 are provided in a side wall 42a of a cap 44 to eject combustion gas towards the gas generator 30. For this reason, the combustion gas ejected from the gas ejecting holes 42 strikes against a crimped portion 48 and its vicinities before it strikes against the inner wall surface 22a of the pressurized gas chamber housing 22, and thereby, an advantageous effect (5) can be exhibited in addition to the advantageous effects (1) to (3). Incidentally, if the inner wall surface 22a of the pressurized gas chamber housing 22 is provided with one or more grooves as shown in FIG. 15, the advantageous effect (4) can be further exhibited. Also, a cap 64, as shown in FIG. 14, can be provided, and a cap 44 shown in other embodiments can be used instead of the cap 64.

Further, since the cap 44 and the diffuser portion 50 satisfy the relation of $L1 \geq D1/2$ and the relation of $L2 \geq D2/2$ like the inflator 10 shown in FIG. 13, the advantageous effects (IIa) to (IIc) can be obtained.

Embodiment 14

Another embodiment will be explained with reference to FIG. 5 to FIG. 7. FIGS. 5(a) and 5(b) are a perspective view and a plan view, respectively, of a cap of one embodiment, FIGS. 6(a) and 6(b) is a perspective view and a plan view, respectively, of a cap of another embodiment, and FIG. 7 is a perspective view of a cap of another embodiment. A cap 44 shown in FIG. 5 to FIG. 7 can be disposed into the inflators 600,700,10,100, and 200 shown in FIG. 11 to FIG. 16, respectively.

In the cap 44 shown in FIG. 5, gas ejecting holes 42 are provided on a side surface of the cap 44a, and a member (restricting member) 45 for circumferentially restricting an ejecting direction of combustion gas from the gas ejecting holes 42. The restricting member 45 is formed in a L-letter shape in plan view. Incidentally, the orientation of the restricting member 45 may be a different direction from that in FIG. 5.

Since such restricting members 45 are provided, combustion gas ejected from the gas ejecting hole 42 is ejected in the direction along the circumferential surface of the cap 44 to form an eddy, so that the advantageous effect (5) can be exhibited in addition to the advantageous effects (1) to (3). Incidentally, when the grooves shown in FIG. 15 can be employed for the inner wall surface 22*a* of the pressurized gas chamber housing 22, the advantageous effect (4) can be further exhibited.

The cap 44 shown in FIGS. 6(*a*) and 6(*b*) is provided with flat plate-shaped restricting members 45 instead of the L-letter-shaped restricting members 45 shown in FIG. 5, and the same advantageous effect as those in FIG. 5 can be obtained.

The cap 44 shown in FIG. 7 is provided on its end wall 44*b* with gas ejecting holes 42, and members (restricting members) 45 for circumferentially restricting an ejected direction of combustion gas from the gas ejecting holes 42. The restricting member 45 can be formed in the same shape as shown in FIG. 5 or FIG. 6. An inflator using the cap 44 shown in FIG. 7 can obtain the same advantageous effects as those in FIG. 5 and FIG. 6.

By adjusting the caps 44 shown in FIG. 5 and FIG. 6 to satisfy the relation of L1≧D1/2, the advantageous effects (IIa) to (IIc) can be obtained like the inflator 10 shown in FIG. 13. In particular, when the caps 44 shown in FIG. 5 and FIG. 6 are used, pieces of the broken first rupturable plate 40 can hardly be discharged out through the gas ejecting holes 42 due to an action of the restricting members, and thereby an arresting effect is further improved.

Embodiment 15

Figure 17:
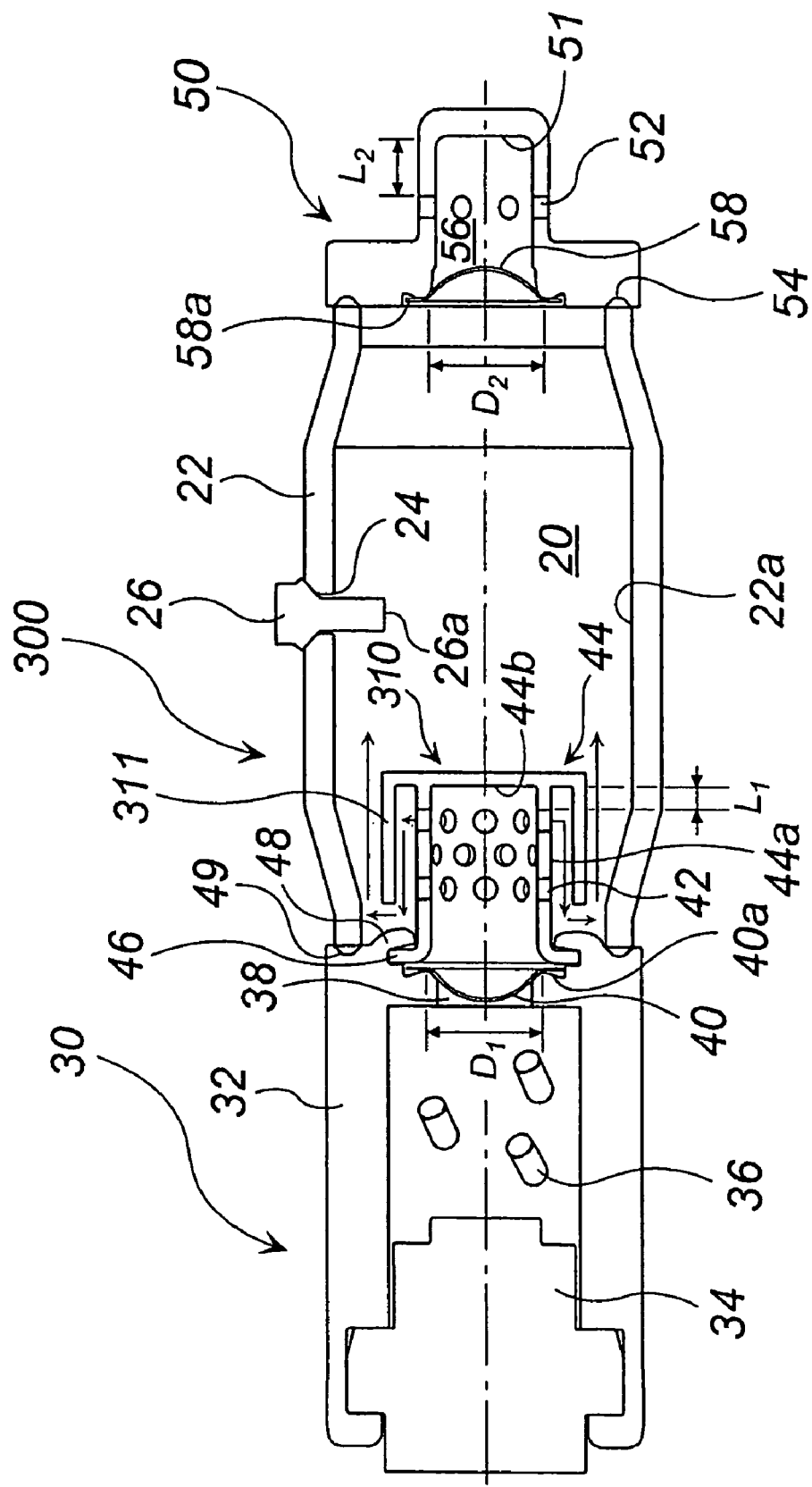
FIG. 17 is a sectional view of an inflator in the axial direction.

Another embodiment will be explained with reference to FIG. 17. FIG. 17 is a sectional view of an inflator in the axial direction. An inflator 300 shown in FIG. 17 has almost the same structure as that of the inflator 10 shown in FIG. 13, and, in FIG. 17, the same reference numerals as these in FIG. 13 denote the same parts. A difference in structure from FIG. 13 and a difference in advantageous effect due to the difference in structure will be explained below.

In the inflator 300 shown in FIG. 17, a cylindrical barrier member 310 is attached thereto. The barrier member 310 has a closed end integrated with an end wall 44*b* of the cap 44 and the other end opened, and it is formed such that a side wall 311 faces gas ejecting holes 42 provided in the side wall of the cap 44 with a distance. Also, a cap 64, as shown in FIG. 14, can be provided, and further, the cap 44 of other embodiments can be used instead of the cap 64.

Since the cap 44 and the diffuser portion 50 satisfy the relation of L1≧D1/2 and the relation of L2≧D2/2 like the inflator 10 shown in FIG. 13, the advantageous effects (IIa) to (IIc) can be obtained.

Further, because the cap 44 is provided with the barrier member 310, the combustion gas ejected from the gas ejecting holes 42 strikes against an inner wall of a side wall 311 of the barrier member, and then, flows out from the opening. Thereby, the advantageous effect (6) can be exhibited in addition to the advantageous effects (1) to (3). Incidentally, when the inflator 300 is provided with grooves in the inner wall surface 22*a* of the pressurized gas chamber housing 22, as shown in FIG. 15, the advantageous effect (4) can be exhibited as well.

Embodiment 16

Figure 18:
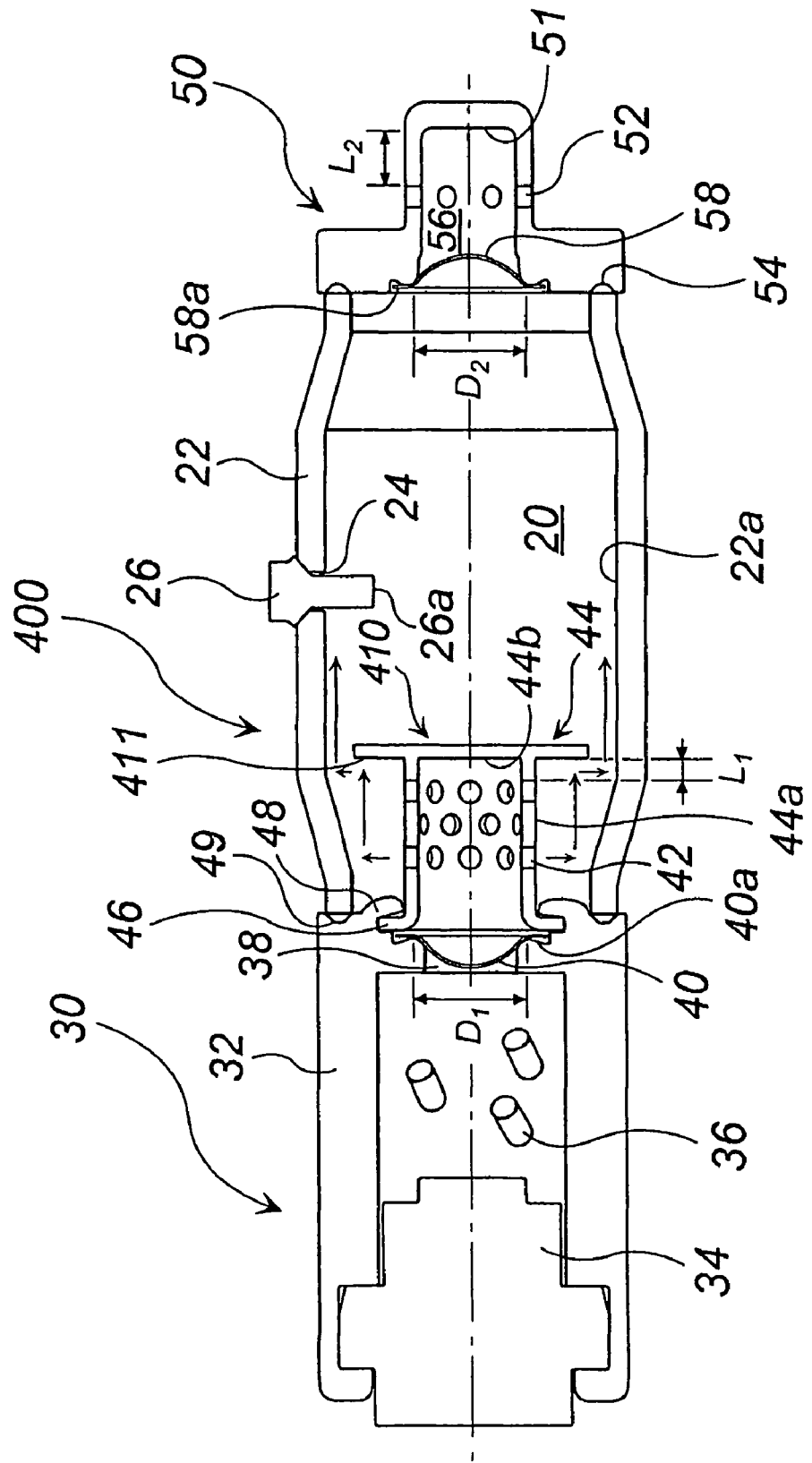
FIG. 18 is a sectional view of an inflator in the axial direction.

Another embodiment will be explained with reference to FIG. 18. FIG. 18 is a sectional view of an inflator in the axial direction. An inflator 400 shown in FIG. 18 has almost the same structure as that of the inflator 10 shown in FIG. 13, and, in FIG. 18, the same reference numerals as those in FIG. 13 denote the same parts. A difference in structure from FIG. 13 and a difference in advantageous effect due to the difference in structure will be explained below.

In the inflator 400 shown in FIG. 18, a disk-like barrier member 410 is attached. The barrier member 410 is integrated with an end wall of the cap 44 and extends from the end surface of the cap 44 towards an inner wall surface 22*a* of the pressurized gas chamber housing 22. Also, as shown in FIG. 14, a cap 64 may be provided, and further, the cap 44 of another embodiment can be used instead of the cap 64.

Since the cap 44 and the diffuser portion 50 satisfy the relation of L1≧D1/2 and the relation of L2≧D2/2 like the inflator 10 shown in FIG. 13, the advantageous effects (IIa) to (IIc) can be obtained.

Further, because of a barrier member 410 attached to the cap 44, combustion gas ejected from the gas ejecting holes 42 strikes against the barrier member 410, and then, flows out from a clearance between the inner wall surface 22*a* of the pressurized gas chamber housing 20 and an peripheral edge portion 411 of the barrier member. Thereby, the advantageous effect (6) can be exhibited in addition to the advantageous effects (1) to (3). Incidentally, when the inflator 400 is provided with grooves in the inner wall surface 22*a* of the pressurized gas chamber housing 22, as shown in FIG. 15, the advantageous effect (4) can further be exhibited.

Embodiment 17

Figure 19:
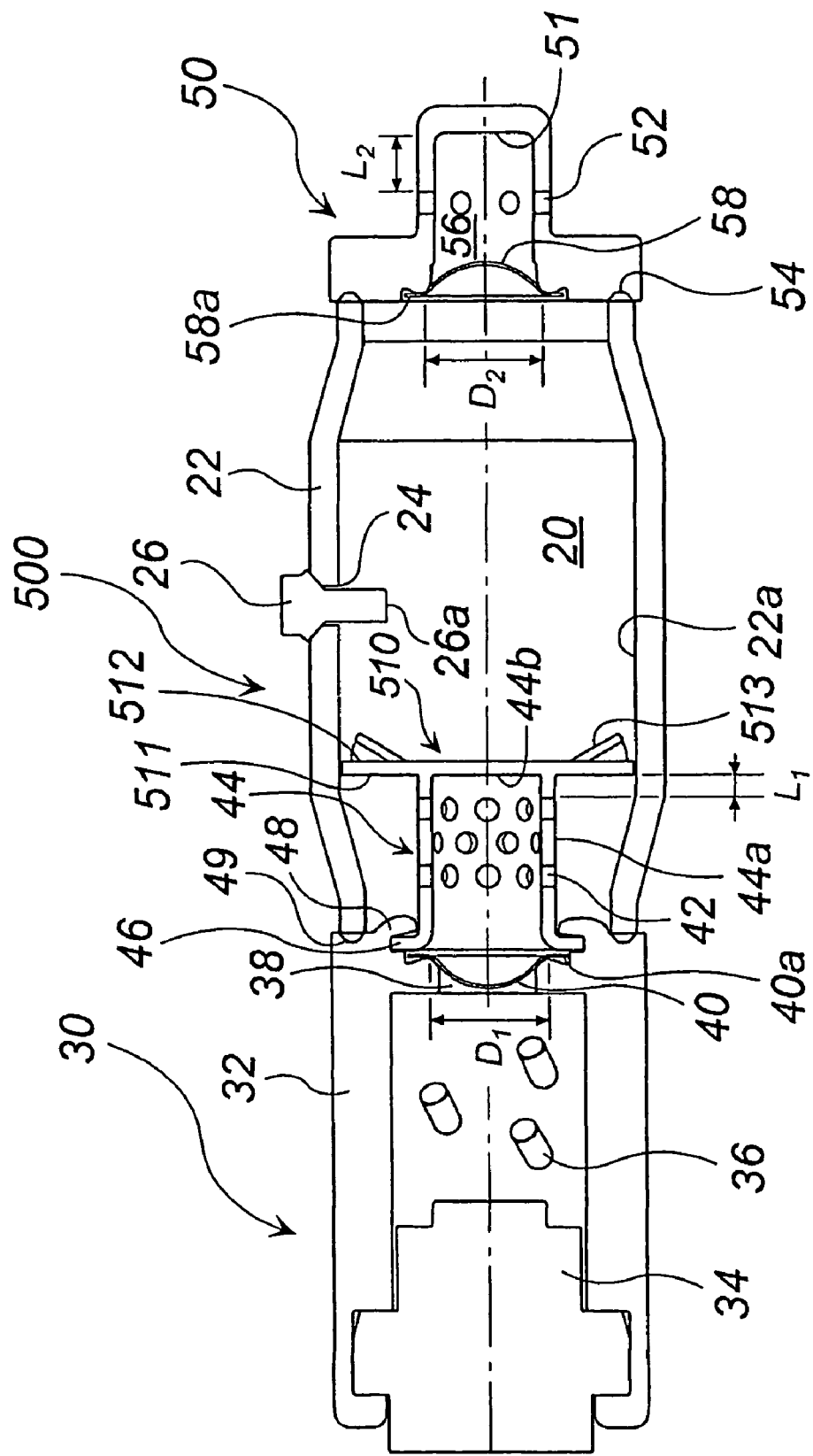
FIG. 19 is a sectional view of an inflator in the axial direction.

Another embodiment will be explained with reference to FIG. 19. FIG. 19 is a sectional view of an inflator in the axial direction. An inflator 500 shown in FIG. 19 has almost the same structure as that of the inflator 10 shown in FIG. 13, and, in FIG. 19, the same reference numerals as those in FIG. 13 denote the same parts. A difference in structure in FIG. 13 and a difference in advantageous effect due to the difference in structure will be explained below.

In the inflator 500 shown in FIG. 19, a disk-like barrier member 510 is attached. The barrier member 510 is integrated with an end wall of the cap 44, and it is extended from the end wall of the cap 44 towards the inner wall surface 22*a* of the pressurized gas chamber housing 20 so that a peripheral edge portion 511 abuts the inner wall surface 22*a*. Gas passing ports 512 and restricting means 513 having similar shapes like those in FIG. 10 are provided in the peripheral edge portion 511. Also, the inflator 500 may be provided with a cap 64, as shown in FIG. 14, and the cap 44 of another embodiment can be used instead of the cap 64.

Since the cap 44 and the diffuser portion 50 satisfy the relation of L1≧D1/2 and the relation of L2≧D2/2 like the inflator 10 shown in FIG. 13, the advantageous effects (IIa) to (IIc) can be obtained.

Further, because of a barrier member 510 attached to the cap 44, combustion gas ejected from the gas ejecting holes 42 strikes against the barrier member 510, and then, it flow out through the gas passing ports 512 and the restricting means 513. Thereby, the advantageous effects (6) and (5)

can be exhibited in addition to the advantageous effects (1) to (3). Incidentally, when grooves are provided in the inner wall surface 22a of the pressurized gas chamber housing 22, as shown in FIG. 15, the advantageous effect (4) can further be exhibited.

The inflator of the present invention can be applied to various inflators such as an air bag inflator for a driver side, an air bag inflator for a passenger side next to a driver, an air bag inflator for a side collision, an inflator for a curtain air bag, an inflator for a knee-bolster, an inflator for an inflatable seat belt, an inflator for a tubular system, an inflator for a pretensioner and the like.

Embodiment 18

Figure 20:
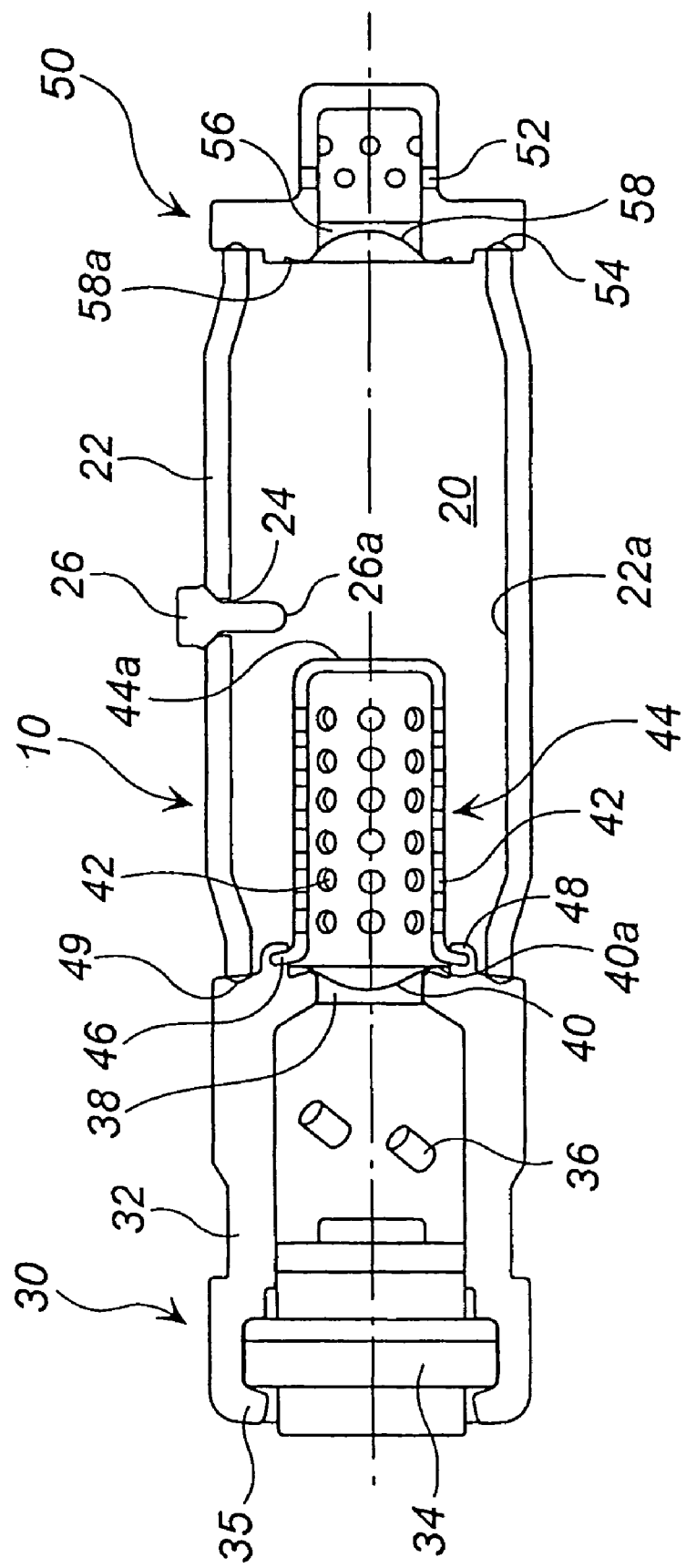
FIG. 20 is a sectional view of an inflator in the axial direction.
Figure 21:
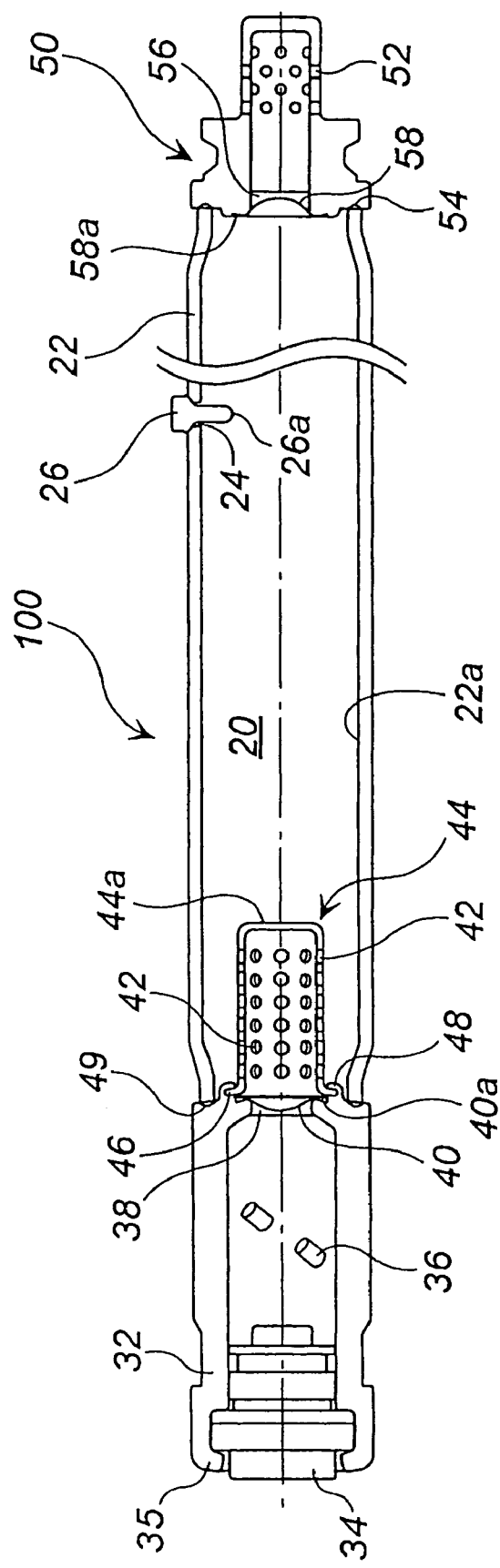
FIG. 21 is a sectional view of an inflator in the axial direction.

Other embodiments of the present invention will be explained with reference to FIG. 20 and FIG. 21. FIG. 20 and FIG. 21 are cross sectional views of embodiments of the present invention. An inflator 10 shown in FIG. 20 and an inflator 100 shown in FIG. 21 have almost the same structure except that the length of the inflator 10 in its axial direction is shorter than that of the inflator 100, and different from each other in the structure of a diffuser portion.

The inflator 10 comprises a pressurized gas chamber 20, a gas generator 30, and a diffuser 50, and outer diameters of these members are approximately the same.

The pressurized gas chamber 20 is defined by an outer shell formed of a cylindrical pressurized gas chamber housing 22, and it is charged with pressurized gas comprising a mixture of argon and helium, not including oxygen gas.

The pressurized gas chamber housing 22 is symmetrical axially and radially, and outer diameters at both ends are reduced to about 22 mm relative to an outer diameter D (about 25 mm) at the central portion thereof. Since a length L of the pressurized gas housing 22 is set to about 50 to 250 mm, L/D is 1 to 10.

Since the pressurized gas chamber housing 22 has such a shape, it is unnecessary to adjust the orientation of the pressurized gas chamber housing in the axial and radial directions at a time of assembly, and joining process of the gas generator 30 and the diffuser portion 50 by resistance-welding or the like can be facilitated.

A charging hole 24 for charging pressurized gas is formed in a side wall of the pressurized gas chamber housing 22, and it is closed by a pin 26 after pressurized gas is charged. A distal end portion 26a of the pin 26 protrudes into the pressurized medium chamber 20, and the protruding portion thereof has such a length that a flow of combustion gas generated by a gas generating agent strikes against the protruding portion. By adjusting the length of the protruding portion of the pin 26, combustion gas can strike against the pin 26 to have combustion residues adhere to the pin 26. In FIG. 20, the pin 26 can be extended until the distal end portion 26a thereof abuts against the opposite wall surface 22a.

The gas generator 30 includes ignition means (e.g., an electrical type igniter) 34 and a gas generating agent 36 accommodated in a gas generator housing 32, and it is connected to one end of the pressurized gas chamber 20. The inflator 10 is fixed by crimping the part 35 of the gas generator housing 35.

The gas generator housing 32 and the pressurized gas chamber housing 22 are connected at a connecting portion 49 by resistance-welding. When the inflator 10 is assembled in an air bag system, the ignition means 34 is connected to an external power source via a connector and a lead wire.

A first communication hole 38 between the pressurized gas chamber 20 and the gas generator 30 is closed by a first rupturable plate 40 transformed into a bowl-like shape due to a pressure of the pressurized gas, and the interior of the gas generator 30 is maintained under the normal pressure. The first rupturable plate 40 is resistance-welded to the gas generator housing 32 at a peripheral edge portion 40a.

A cap 44 having gas ejecting holes 42 covers the first rupturable plate 40 from the pressurized gas chamber 20 side. The cap 44 is attached to cover the first rupturable plate 40, so that combustion gas generated by combustion of the gas generating agent 36 is always ejected through the gas ejecting holes 42 of the cap 44.

The cap 44 has a flange portion 46 formed by folding an opening peripheral edge portion outwardly, and it is fixed by crimping a portion (a crimping portion) 48 of the gas generator housing 32 at the flange portion 46.

A diffuser portion 50 having gas discharging holes 52 for discharging the pressurized gas and the combustion gas is connected to the other end side of the pressurized gas chamber 20, and the diffuser portion 50 and the pressurized gas chamber housing 22 is resistance-welded to each other at a connecting portion 54. A filter made of wire mesh can be disposed inside the diffuser portion 50 in order to arrest the combustion residue, if required.

A second communication hole 56 between the pressurized gas chamber 20 and the diffuser portion 50 is closed by a second rupturable plate 58 transformed into a bowl-like shape due to pressure of the pressurized gas, and the interior of the diffuser portion 50 is maintained in the normal pressure. The second rupturable plate 58 is resistance-welded to the diffuser portion 50 at a peripheral edge portion 58a.

The details of requirements (1) to (8) in an inflator 10 shown in FIG. 20 is as follows:

Requirements (1) and (6)

Pressurized gas comprising a mixture of argon and helium, but not including oxygen gas is charged in a gas generator 20 under a charging pressure of 30,000 to 67,000 kPa.

Requirements (2) and (5)

As a gas generating agent 36, one with a cylindrical shape comprising nitroguanidine/strontium nitrate/sodium carboxymethylcellulose/acid clay=34.3/49.6/9.4/6.7 (mass %) (pressure index=0.6, combustion flame temperature=2098° C.) is used in the amount of 1.9 to 5.3 g.

Requirement (3)

A ratio of an amount (mole number) of pressurized gas (A1) and an amount (mole number) of a gas generated by combustion of a gas generating agent (A2), A1/A2=1 to 20;

Requirement (4)

A ratio of a mass of pressurized gas (B1) and a mass of a gas generating agent (B2), B1/B2=1 to 20;

Requirement (7)

A ratio of an amount (mole number) of pressurized gas (A1) and a total surface opening ($cm^2$) of a gas generating agent (C), A1/C=0.004 to 0.05 mole/$cm^2$;

Requirement (8)

A ratio of a total surface area ($cm^2$) of a gas generating agent (C) and a total area ($cm^2$) of gas discharging holes (D), C/D is 0.5 to 4;

Next, an operation of the inflator 10 shown in FIG. 20 when assembled in an air bag system mounted on an automobile will be explained.

When an automobile receives an impact by a collision, the igniter 34 is activated upon receiving an actuation signal from a control unit to burn the gas generating agent 36, and thereby, combustion gas of a high temperature is generated.

Thereafter, the first rupturable plate 40 is broken by a pressure increase inside the gas generator 30 due to the high temperature combustion gas, and combustion gas including a combustion residue flows into the cap 44 and ejected from the gas ejecting holes 42. At this time, since a temperature difference between the pressurized gas and the combustion gas in the pressurized gas chamber 20 is large, the combustion gas is cooled rapidly, so that the high temperature combustion residue is cooled, and combustion residues, solidified due to the temperature reduction, also adhere to an inner wall surface of an end surface 44a of the cap 44. Further, since the combustion gas ejected strikes against an inner wall 22a of the pressurized gas chamber housing 22, the combustion residues adhere to an inner wall surface and can be prevented from being discharged from the inflator 10. Incidentally, part of the remaining combustion residue adheres to the pin 26, too.

Thereafter, since the second rupturable plate 58 is broken by a pressure increase inside the pressurized gas chamber 20, the pressurized gas and the combustion gas are discharged from the gas discharging holes 52 via the second communication hole 56 to inflate an air bag.

In such a course of action, since the inflator 10 is provided with the above-described requirements (1) to (6), or preferably (1) to (8), the internal pressure in the inflator is controlled not to increase excessively when the gas generating agent is burnt, even with the high pressurized-gas charging pressure of 30,000 to 67,000 kPa. As a result, the air bag can be inflated within an optimal time for protecting an occupant (generally, which is considered to be 10 to 30 msec).

Further, an internal pressure of the inflator when the gas generating agent is burnt can be controlled suitably, and thereby, the size of the inflator can be made small while the charged amount of the pressurized gas is maintained equal to that in the prior art, that is, an amount of the pressurized gas for inflating the air bag is secured. As the result of downsizing the inflator, even when the charging pressure of the pressurized gas increases, an internal pressure of the inflator at an actuation can be controlled suitably.

The inflators of the present invention can be applied to various inflators such as an air bag inflator for a driver side, an air bag inflator for a passenger side next to a driver, an air bag inflator for a side collision, an inflator for a curtain air bag, an inflator for a knee-bolster, an inflator for an inflatable seat belt, an inflator for a tubular system, an inflator for a pretensioner and the like.

EXAMPLES

The present invention will be explained in detail as follows on the basis of Examples, but the present invention is not limited to these Examples.

Example 1

An inflator having the structure shown in FIG. 20 was built. An entire length of the inflator was 110 mm, a length (L) of a pressurized gas chamber housing is 60 mm, an outer diameter (D) thereof is 25 mm, an thickness thereof is 2 mm (material: seamless steel pipe), and outer diameters of the other portions of the inflator were almost the same. The detail of the requirements (1) to (8) and the like are as follows:

Requirement (1): A mixed gas comprising 96 mole % of argon and 4 mole % of helium but not including oxygen gas;

Requirement (2): one in a cylindrical shape comprising nitroguanidine/strontium nitrate/sodium carboxymethyl-cellulose/acid clay=34.3/49.6/9.4/6.7 (mass %) (pressure index=0.6, combustion flame temperature=2098° C.);

Requirement (3): A1/A2=0.3/0.047=6.4;

Requirement (4): B1/B2=11.7/1.9=6.2;

Requirement (5): The amount of a gas generating agent was 1.9 g;

Requirement (6): The charging pressure of pressurized gas was 42,000 kPa;

Requirement (7): A1/C=0.3/46.9=0.0064;

Requirement (8): C/E=46.9/21.2=2.2;

L/D=2.4;

A well known 60 L tank combustion test, for example, as described in a paragraph 11 of JP-B No. 2963086, was conducted with this inflator. A tank curve is shown in FIG. 22.

Figure 22:
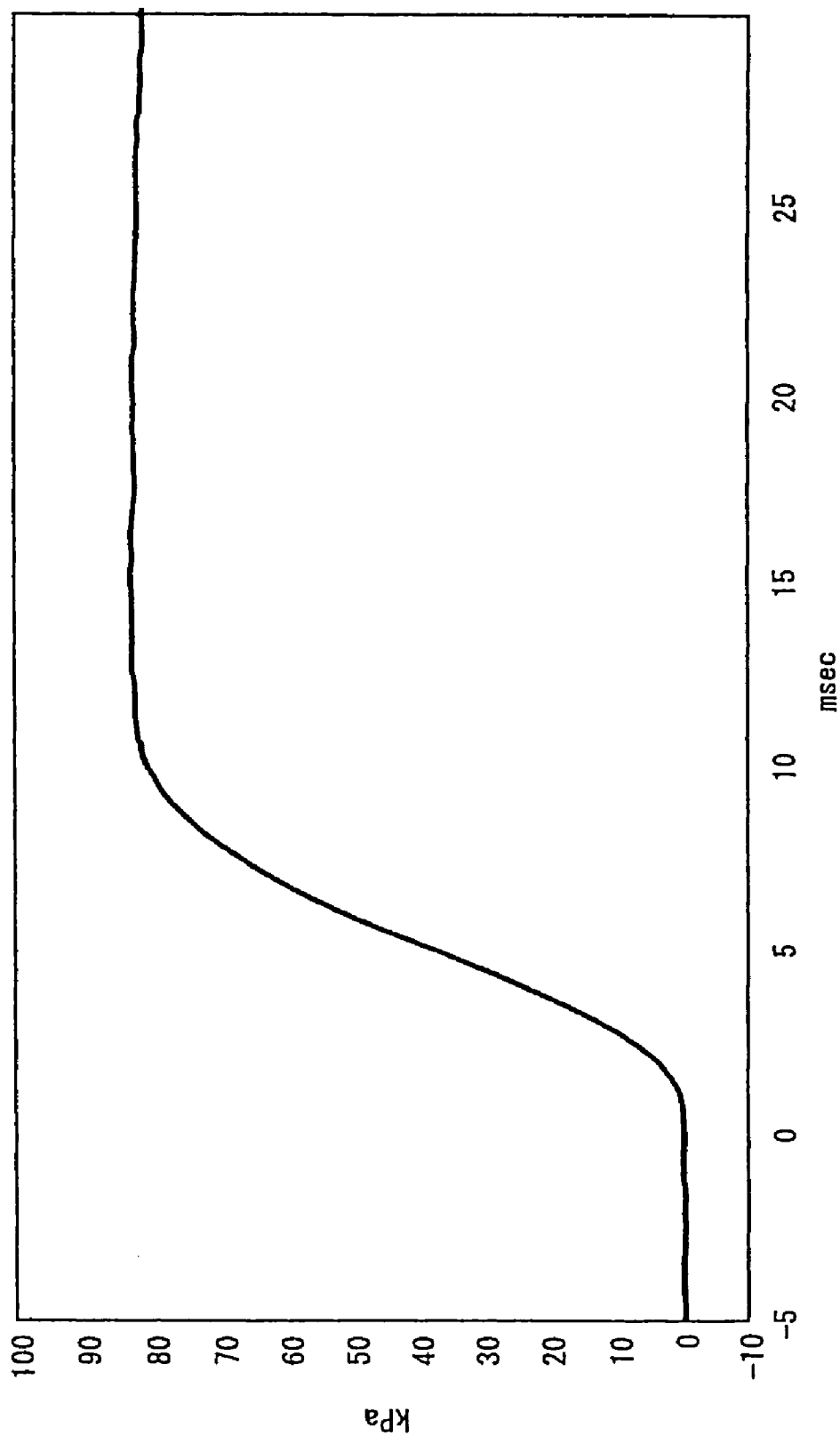
FIG. 22 is a tank curve obtained in a 60-liters tank combustion test conducted in Example 1.

As apparent from the tank curve shown in FIG. 22, even when the inflator itself was downsized and an internal pressure of the inflator was high before actuation, an internal pressure of the inflator at an actuation time was controlled by satisfying the requirements (1) to (8). As a result, it was confirmed that the air bag was inflated to its maximum at about 10 msec and that the inflator was actuated as intended.

Example 2

An inflator having the structure shown in FIG. 21 was built. An entire length of the inflator was 280 mm, a length (L) of a pressurized gas chamber housing is 200 mm, an outer diameter (D) thereof is 25 mm, an thickness thereof is 2 mm (material: seamless steel pipe), and outer diameters of the other portions of the inflator were almost the same. The detail of the requirements (1) to (8) and the like are as follows:

Requirement (1): A mixed gas comprising 96 mole % of argon and 4 mole % of helium but not including oxygen gas;

Requirement (2): one in a cylindrical shape comprising nitroguanidine/strontium nitrate/sodium carboxymethyl-cellulose/acid clay=34.3/49.6/9.4/6.7 (mass %) (pressure index=0.6, combustion flame temperature=2098° C.);

Requirement (3): A1/A2=1.09/0.130=8.4;

Requirement (4): B1/B2=42/5.3=7.9;

Requirement (5): The amount of a gas generating agent was 5.3 g;

Requirement (6): The charging pressure of pressurized gas was 42,000 kPa;

Requirement (7): A1/C=1.09/72.5=0.015;

Requirement (8): C/E=72.5/42.4=1.7;

L/D=8.0;

The same 60-liter tank combustion test was conducted with this inflator as in Example 1, and a tank curve generally equal to that in FIG. 22 was obtained.

Incidentally, when compared with the fact that, in the paragraph 136 of in JP-A 9-76870 described as the prior art, there is a description that an interior of an inflator housing is maintained under a high pressure such as 4000 psi (27,600 kPa) or so, an internal pressure of the inflator of Example 1 at a time of actuation is expected to be much higher than that in the prior art. However, since the requirements (1) to (8) were provided, an internal pressure of the inflator was controlled so that the inflator was operated as intended.

The invention claimed is:

1. An inflator, comprising:
   a pressurized medium chamber defined by an outer shell formed of a cylindrical pressurized medium chamber housing and charged with a pressurized medium;
   a gas generator connected to one end of the pressurized medium chamber and including ignition means and a gas generating agent accommodated in a gas generator housing;
   a diffuser portion connected to the other end of the pressurized medium chamber;
   a first rupturable plate that closes a first opening between the pressurized medium chamber and the gas generator;
   a second rupturable plate that closes a second opening between the pressurized medium chamber and the diffuser portion;
   a cap having a gas ejecting hole for ejecting combustion gas generated by the gas generating agent only in a radial direction and then forcing the ejected combustion gas to flow along a longitudinal direction of the pressurized medium chamber, the cap covering the first rupturable plate from the pressurized medium chamber side,
   wherein at least one selected from the following requirements (a), (b), and (c) is provided,
   (a) an inner wall surface of the pressurized medium chamber housing is rough,
   (b) the gas ejecting hole is oriented such that combustion gas ejected from the gas ejecting hole does not strike against an inner wall surface of the pressurized medium chamber housing; and
   (c) a barrier member is disposed in the vicinity of the gas ejecting hole, and combustion gas ejected from the gas ejecting hole moves after the combustion gas strikes against the barrier member.

2. An inflator, according to claim 1, wherein the cap has a flange portion formed by outwardly folding a peripheral edge portion of an opening thereof and is fixed at the flange portion by crimping part of the gas generator housing.

3. An inflator according to claim 1, wherein the housing forming the pressurized medium chamber is symmetrical in the axial and radial directions.

4. An inflator according to claim 1, wherein a pressurized medium charging hole is formed in a side wall of the pressurized medium chamber housing, and the charging hole is closed by a pin after the pressurized medium is charged.

5. An inflator according to claim 1, wherein, in the gas generating agent, a melting point of combustion residues produced by combustion of the gas generating agent is not less than a discharging temperature of a gas generated by the gas generating agent.

6. An inflator for inflating an air bag with combustion gas generated by combustion of a gas generating agent and a pressurized medium, comprising:
   a pressurized gas chamber defined by an outer shell formed of a cylindrical pressurized gas chamber housing and charged with a pressurized gas;
   a gas generator connected to the pressurized gas chamber and including ignition means and a gas generating agent accommodated in a gas generator housing;
   a diffuser portion connected to the pressurized gas chamber at a portion other than the gas generator;
   a first rupturable plate that closes a first opening between the pressurized gas chamber and the gas generator;
   a second rupturable plate that closes a second opening between the pressurized gas chamber and the diffuser portion; and
   a cap member having a plurality of gas ejecting holes through which gas passes only in a radial direction, the cap member preventing a fragment of at least one of pieces generated by breaking the first rupturable plate and the second rupturable plate and a combustion residue contained in combustion gas generated by the gas generating agent from flowing outside the inflator by the cap member.

7. An inflator according to claim 6, wherein the cap member is disposed inside the pressurized gas chamber and covers the first rupturable plate from a side of the pressurized gas chamber.

8. An inflator, according to claim 6, wherein the cap member is a cylindrical member having one end opened and the other end closed, and the plurality of gas ejecting holes are provided in a peripheral wall thereof.

9. An inflator according to claim 6, wherein a relationship between a distance L from a closed end surface of the cap member to a gas ejecting hole closest to the closed end surface and a diameter D of the rupturable plate satisfies the following formula: $L \geq D/2$.

10. An inflator according to claim 9, wherein the distance L is 3 to 8 mm.

11. An inflator according to claim 6, wherein diameters of the plurality of the gas ejecting holes in the cap member are 0.5 to 2 mm.

12. An inflator according to claim 6, wherein a total opening area of the plurality of the gas ejecting holes in the cap member is 20 to 1000 $mm^2$.

13. An inflator according to claim 6, wherein the cap member is disposed such that the axial direction of the cap member and the axial direction of the pressurized gas chamber housing coincide with each other.

14. An inflator according to claim 6, further comprising:
   means for changing a flow direction of the combustion gas by the cap member, making the combustion residue adhere to at least one portion of a wall surface of said means for changing the flow direction, and making the combustion gas contact with the pressurized gas to cool and solidify the combustion residue due to a temperature difference,
   wherein a melting point of the combustion residue is not less than a discharging temperature of a gas generated by the gas generating agent.

15. An inflator according to claim 6, wherein the cap member has a flange portion formed by outwardly folding a peripheral edge portion of an opening and is fixed at the flange portion by crimping part of the gas generator housing.

16. An inflator according to claim 6, wherein the housing forming the pressurized gas chamber is symmetrical in the axial and radial directions.

17. An inflator according to claim 6, wherein a pressurized gas charging hole is formed in a side wall of the pressurized gas chamber housing, and the charging hole is closed by a pin after the pressurized gas is charged.

18. An inflator according to claim 17, wherein the pin protrudes into the pressurized gas chamber and the protruding portion thereof has such a length that combustion gas flow of the gas generating agent strikes against the protruding portion.

19. An inflator according to claim 6, wherein the gas generator housing and the pressurized gas chamber housing are connected to each other by resistance-welding.

20. An inflator according to claim 6, wherein, in the gas generating agent, a melting point of combustion residue is not less than a discharging temperature of a gas generated by the gas generating agent.

21. An inflator according to claim 6, wherein the gas generating agent includes 20 to 60 mass % of nitroguanidine and 80 to 40 mass % of an oxidizing agent.

22. An inflator according to claim 6, wherein the pressurized gas comprises argon and helium.

23. An inflator according to claim 6, wherein a ratio (A/B) of mole number (A) of the pressurized gas and a mole number (B) of a gas generated by combustion of the gas generating agent is 0.2 to 10.

24. An inflator for inflating an air bag with pressurized gas and combustion gas generated by combustion of a gas generating agent, comprising the following requirements (1) to (6):
   (1) pressurized gas containing an inert gas and substantially no oxygen;
   (2) in the gas generating agent, a pressure index obtained by the following formula: $rb=\alpha P^n$ being 0.8 or less, where in the formula, rb: burning velocity, $\alpha$: coefficient, P: pressure, and n: pressure index;
   (3) a ratio A1/A2 of an amount, in mole number, of pressurized gas (A1) and an amount, in mole number, of gas generated by combustion of a gas generating agent (A2) being 1 to 20;
   (4) a ratio B1/B2 of a mass (B1) of pressurized gas (B1) and a mass (B2) of a gas generating agent being 1 to 20;
   (5) a mass of a gas generating agent being 0.5 to 30 g; and
   (6) a charging pressure of pressurized gas being 30,000 to 67,000 kPa.

25. An inflator according to claim 24, wherein, in the requirement (2), a combustion flame temperature of the gas generating agent is not more than 3000° C.

26. An inflator according to claim 24, wherein, in the requirement (2), the gas generating agent is a non-azide gas generating agent.

27. An inflator according to claim 24, further comprising:
   (7) a ratio A1/C of an amount, in mole numbers, (A1) of the pressurized gas and a total surface area ($cm^2$) (C) of the gas generating agent being 0.004 to 0.05 mole/$cm^2$.

28. An inflator according to claim 24, further comprising:
   (8) a ratio C/E of a total surface area ($cm^2$) (C) of the gas generating agent and a total area ($cm^2$) (E) of the gas discharging hole being 0.5 to 4.

29. An inflator according to claim 24, wherein the inflator has a pressurized gas chamber having an outer shell formed by a cylindrical pressurized gas chamber housing and charged with pressurized gas, and an outer diameter of the pressurized gas chamber housing is preferably not more than 40 mm.

30. An inflator according to claim 24, wherein the inflator has a pressurized gas chamber having an outer shell formed by a cylindrical pressurized gas chamber housing and charged with pressurized gas, and a ratio (L/D) of an outer diameter (D) and a length (L) of the pressurized gas chamber housing is preferably 1 to 10.

31. An inflator according to claim 24, wherein the inflator has a pressurized gas chamber having an outer shell formed by a cylindrical pressurized gas chamber housing and charged with pressurized gas, and the pressurized gas chamber housing is symmetrical regarding the axial and radial directions.

32. An inflator according to claim 24, wherein the inflator has a pressurized gas chamber having an outer shell formed by a cylindrical pressurized gas chamber housing and charged with pressurized gas, and the pressurized gas chamber housing is symmetrical regarding the axial and radial directions and both ends thereof are reduced in diameter.

33. An inflator according to claim 24, wherein the inflator has a pressurized gas chamber having an outer shell formed by a cylindrical pressurized gas chamber housing and charged with pressurized gas, a pressurized gas charging hole is formed in a side surface of the pressurized gas chamber housing, and the gas charging hole is closed by a pin after the pressurized gas is charged.

34. An inflator according to claim 33, wherein the pin is protruding into the pressurized gas chamber housing and a protruding portion thereof has such a length that combustion gas flow strikes against the protruding portion.

35. An inflator according to claim 24, wherein the inflator includes,
   a pressurized gas chamber having an outer shell formed by a cylindrical pressurized gas chamber housing and charged with pressurized gas,
   a gas generator having an outer shell formed by a gas generator housing and including an ignition means and a gas generating agent inside the housing, and
   a diffuser portion,
   wherein the gas generator housing is connected to one end of the pressurized gas chamber housing and the diffuser portion is connected to the other end of the pressurized gas housing, and
   a first rupturable plate closes between the pressurized gas chamber and the gas generator and a second rupturable plate closes between the pressurized gas chamber and the diffuser portion.

36. An inflator according to claim 35, wherein a cap having a gas ejecting hole provided in at least one of a side surface and an end surface thereof covers the first rupturable plate from the pressurized gas chamber side.

37. An inflator according to claim 35, wherein the gas generator housing and the pressurized gas chamber housing, and the diffuser portion and the pressurized gas chamber housing are connected by resistance-welding.

38. An inflator according to claim 35, wherein the outer diameters of the pressurized gas chamber housing, the gas generator housing and the diffuser portion are equal or approximate to one another.

39. An air bag system provided with an actuation-signal outputting means, comprising:
   an impact sensor;
   a control unit; and
   a module case accommodating an inflator according to claim 24 and an air bag.

40. An inflator for inflating an air bag, comprising:
   a cylindrical housing defining therein a pressurized medium accommodating space for storing a pressurized medium, and also defining an opening at one end thereof;
   a closure member that covers the opening and defining a passage therein, the closure member being provided such that a one end surface of the closure member attaches the one end of the cylindrical housing;
   a rupturable disk isolating the pressurized medium accommodating space by sealing the passage;
   a cup member having a side wall that defines a port and an open end provided with a flange extending in an outward direction, the cup member being disposed inside the pressurized medium accommodating space such that the port directly opposes an inner surface of the cylindrical housing, and covering the passage and the rupturable disk; and
   a fixing member for fixing the cup member to the closure member by being bent over the flange, the closure member formed as one piece with the fixing member.

41. An inflator according to claim 40, wherein the pressurized medium comprises argon and helium.

42. The inflator according to claim 40, wherein the closure member defines an ignition device accommodation chamber for accommodating an ignition device therein.

43. The inflator according to claim 40, further comprising:
a second closure member covering a second opening defined by the cylindrical housing, the second closure member defining a gas discharging hole for discharging the pressurized medium to the outside of the inflator.

44. The inflator according to claim 40, wherein the cylindrical housing is reduced in an outer diameter at both ends hereof.

45. The inflator according to claim 40, wherein the cup member includes a bottom surface formed at an opposite side of the open end thereof and the bottom surface is provided with a gas passing port.

46. The inflator according to claim 40, further comprising:
an ignition device including an igniter and a gas generating agent that is isolated from the pressurized medium before activation of the inflator.

47. An inflator for inflating an air bag, comprising:
a cylindrical housing defining therein a pressurized medium accommodating space storing a pressurized medium, and also defining an opening at one end thereof;
a closure member that covers the opening and defining a passage therein, the closure member being provided such that a one end surface of the closure member attaches the one end of the cylindrical housing, the closure member having a protruding portion extending towards the pressurized medium accommodating space, the closure member formed as one piece with the protruding portion;
a rupturable disk isolating the pressurized medium accommodating space by sealing the passage; and
a cup member having a side wall that defines a port and an open end provided with a flange extending in an outward direction, the cup member being disposed inside the pressurized medium accommodating space such that the port directly opposes an inner surface of the cylindrical housing, and severing the rupturable disk and the passage, the cup member being attached to the closure member by bending the protruding portion over the flange.

48. The inflator according to claim 47, wherein the closure member defines an ignition device accommodation chamber for accommodating an ignition device therein.

49. The inflator according to claim 47, further comprising:
a second closure member covering a second opening defined by the cylindrical housing, the second closure member defining a gas discharging hole for discharging the pressurized medium to the outside of the inflator.

50. An inflator according to claim 47, wherein the pressurized medium comprises argon and helium.

51. The inflator according to claim 47, wherein the cylindrical housing is reduced in an outer diameter at both ends thereof.

52. The inflator according to claim 47, wherein the cup member includes a bottom surface formed at an opposite side of the open end thereof and the bottom surface is provided with a gas passing port.

53. The inflator according to claim 47, further comprising:
an ignition device including an igniter and a gas generating agent isolated from the pressurized medium prior to activation of the inflator.

* * * * *

UNITED STATES PATENT AND TRADEMARK OFFICE
CERTIFICATE OF CORRECTION

| | |
|---|---|
| PATENT NO. | : 7,134,689 B2 |
| APPLICATION NO. | : 10/305234 |
| DATED | : November 14, 2006 |
| INVENTOR(S) | : Naoki Matsuda et al. |

It is certified that error appears in the above-identified patent and that said Letters Patent is hereby corrected as shown below:

<u>(Col. 42, line 8)</u>:

Change "severing" to --covering--.

Signed and Sealed this

Twentieth Day of May, 2008

JON W. DUDAS
*Director of the United States Patent and Trademark Office*